(12) United States Patent
Ying

(10) Patent No.: US 9,170,619 B2
(45) Date of Patent: Oct. 27, 2015

(54) NETWORK NODE WITH INTEGRATED POWER DISTRIBUTION

(71) Applicant: I/O Controls Corporation, Azusa, CA (US)

(72) Inventor: Jeffrey Ying, Glendora, CA (US)

(73) Assignee: I/O Controls Corporation, Azuza, CA (US)

( * ) Notice: Subject to any disclaimer, the term of this patent is extended or adjusted under 35 U.S.C. 154(b) by 0 days.

(21) Appl. No.: 13/911,040

(22) Filed: Jun. 5, 2013

(65) Prior Publication Data

US 2014/0156091 A1 Jun. 5, 2014

Related U.S. Application Data

(60) Continuation of application No. 13/229,626, filed on Sep. 9, 2011, now Pat. No. 8,477,501, which is a division of application No. 12/757,811, filed on Apr. 9, 2010, now abandoned, which is a continuation of application No. 11/046,539, filed on Jan. 28, 2005, now Pat. No. 7,724,778.

(51) Int. Cl.
*G06F 1/26* (2006.01)
*H02J 13/00* (2006.01)
*H04L 12/10* (2006.01)
*H04L 12/403* (2006.01)
*H04L 12/40* (2006.01)

(52) U.S. Cl.
CPC .............. *G06F 1/26* (2013.01); *H02J 13/0062* (2013.01); *H04L 12/10* (2013.01); *H04L 12/403* (2013.01); H04L 2012/40267 (2013.01); Y02B 60/33 (2013.01); Y10T 29/4913 (2015.01)

(58) Field of Classification Search
USPC ........................ 701/1; 700/286; 370/254, 286
See application file for complete search history.

(56) References Cited

U.S. PATENT DOCUMENTS

| | | | |
|---|---|---|---|
| 4,780,714 A | 10/1988 | Moustakas et al. | |
| 4,956,561 A | 9/1990 | Tamer | |
| 5,457,629 A | 10/1995 | Miller et al. | |
| 5,477,091 A | 12/1995 | Fiorina et al. | |
| 5,907,486 A | 5/1999 | Ying | ............................. 364/132 |
| 5,928,292 A | 7/1999 | Miller et al. | |
| 6,061,600 A | 5/2000 | Ying | ................................ 700/3 |
| 6,094,416 A | 7/2000 | Ying | ............................. 370/222 |
| 6,147,967 A | 11/2000 | Ying et al. | ..................... 370/222 |

(Continued)

FOREIGN PATENT DOCUMENTS

| | | | | |
|---|---|---|---|---|
| GB | 2 277 618 A | 11/1994 | | |
| JP | 59062968 | 4/1984 | ............. | G06F 15/16 |

(Continued)

*Primary Examiner* — Yonel Beaulieu
(74) *Attorney, Agent, or Firm* — Irell & Manella LLP

(57) ABSTRACT

A control network comprises a plurality of network nodes arranged in a plurality of tiers, with first-tier nodes and lower tier nodes. A master control bus interconnects the first-tier nodes, which are also connected to a power source. Lower-tier buses interconnect groups of the lower tier nodes. The lower-tier buses include both data lines and a power source line derived from the power source, allowing the lower tier nodes to selectively distribute power to local loads. A first-tier node may be embodied as a hub controller configured to be connected to one or more of said lower-tier buses. The hub controller may comprise a plurality of internal hub nodes (including a hub master node and hub slave nodes) integrated within the same physical unit.

24 Claims, 23 Drawing Sheets

(56) References Cited

U.S. PATENT DOCUMENTS

| | | | |
|---|---|---|---|
| 6,195,243 B1 | 2/2001 | Spencer et al. | |
| 6,201,316 B1 | 3/2001 | Knecht | |
| 6,201,995 B1 | 3/2001 | Ying | 700/3 |
| 6,356,823 B1 | 3/2002 | Iannotti et al. | |
| 6,404,326 B1 | 6/2002 | Timmerman et al. | |
| 6,420,797 B1 | 7/2002 | Steele et al. | |
| 6,611,860 B1 | 8/2003 | Ying | 709/208 |
| 6,732,217 B1 | 5/2004 | Nishikido | 710/306 |
| 6,757,521 B1 | 6/2004 | Ying | 455/67.11 |
| 6,816,466 B1 | 11/2004 | Daniel | 370/254 |
| 6,847,916 B1 | 1/2005 | Ying | 702/183 |
| 6,961,306 B2 | 11/2005 | Ying | 370/222 |
| 6,965,560 B2 | 11/2005 | Ying et al. | 370/222 |
| 7,046,621 B2 | 5/2006 | Wang et al. | 370/222 |
| 7,146,450 B2 | 12/2006 | Saitou et al. | 710/306 |
| 7,398,083 B2 | 7/2008 | Ying | 455/423 |
| 7,398,299 B1 | 7/2008 | Ying | 709/208 |
| 7,724,778 B2 | 5/2010 | Ying | 370/489 |
| 8,477,501 B2 * | 7/2013 | Ying | 361/719 |
| 2002/0108065 A1 | 8/2002 | Mares | |
| 2004/0049321 A1 | 3/2004 | Lehr et al. | 700/286 |
| 2005/0033996 A1 | 2/2005 | Fong et al. | 713/300 |
| 2005/0113988 A1 | 5/2005 | Nasr et al. | 701/22 |
| 2005/0114007 A1 | 5/2005 | Pillar et al. | 701/82 |

FOREIGN PATENT DOCUMENTS

| | | | |
|---|---|---|---|
| JP | 61161568 | 7/1986 | G06F 15/16 |
| JP | 04286239 | 10/1992 | H04L 12/40 |
| JP | 04299429 | 10/1992 | G06F 11/20 |
| JP | 05088996 | 4/1993 | G06F 13/00 |
| JP | 10084372 A | 3/1998 | |
| JP | 10303952 | 11/1998 | |
| WO | WO/01/77765 | 10/2001 | |

\* cited by examiner

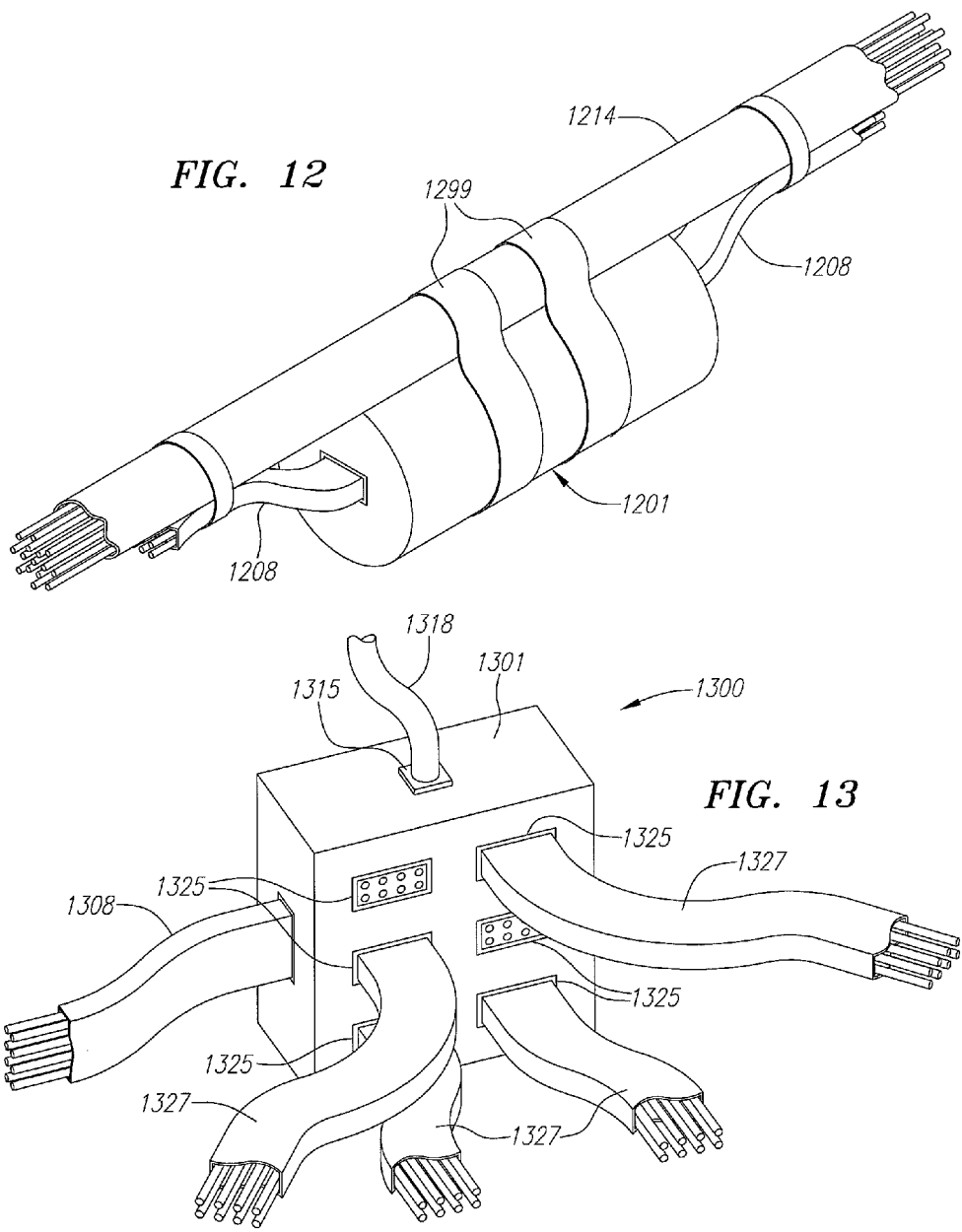

NETWORK NODE WITH INTEGRATED POWER DISTRIBUTION

CROSS REFERENCE TO RELATED APPLICATIONS

This application is a continuation of U.S. application Ser. No. 13/229,626 filed Sep. 9, 2011, now U.S. Pat. No. 8,477, 501, which is a divisional of U.S. application Ser. No. 12/757, 811, filed Apr. 9, 2010, now abandoned, which is a continuation of U.S. application Ser. No. 11/046,539 filed Jan. 28, 2005, now U.S. Pat. No. 7,724,778, which is hereby incorporated by reference as if set forth fully herein.

BACKGROUND OF THE INVENTION

1) Field of the Invention

The field of the present invention generally relates to control networks and related methods for configuring and operating control networks.

2) Background

Automated control systems are commonly used in a number of manufacturing, transportation, and other applications, and are particularly useful for controlling machinery, sensors, electronics, and other system components. For example, manufacturing or vehicular systems may be outfitted with a variety of sensors and automated electrical and/or mechanical parts that require enablement or activation when needed to perform their assigned functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery and electronics have grown in number and complexity, a need has arisen for ways to exercise control over the various components of a system rapidly, efficiently and reliably. The sheer number of system components to be monitored, enabled, disabled, activated, deactivated, adjusted, or otherwise controlled can lead to challenges in designing and implementing sophisticated control systems. As the number of controlled components in a system increases, not only do control functions become more complicated, but also the wiring or inter-connections of the control system become more elaborate and complex. A robust, scalable control system is therefore needed.

In addition, increasing reliance on automated control in various fields has resulted in more significant potential consequences if the automated control system fails. Therefore, a need exists for a reliable control system that is nevertheless capable of controlling large systems if necessary.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. A typical transit car may be outfitted with hundreds of pounds of wiring and related electronic components. Wiring for conventional control systems can be expensive, both from a material standpoint and a labor standpoint (to layout the wiring throughout the vehicle). Conventional control systems can also be costly to maintain and diagnose, especially where wiring is complicated and profuse.

Substantial improvements in the field of automated control in general, and vehicular control in particular, are described in, for example, U.S. Pat. Nos. 5,907,486, 6,061,600, 6,094, 416, 6,147,967, and 6,201,995, each of which is assigned to the assignee of the present invention, and each of which is hereby incorporated by reference as if set forth fully herein.

In many network settings, the controlled machinery, sensors, electronics, and other system components require electronic power to operate. Often power cables or wires are run independently throughout the controlled network in order to feed power to the various system components. The power distribution system therefore may lead to a second network of wires within the system (e.g., vehicle), which may, among other things, complicate layout, diagnosis, and maintenance of the network.

Accordingly, it would be advantageous to provide a system, architecture, and/or method that overcomes one or more of the foregoing problems, disadvantages, or drawbacks.

SUMMARY OF THE INVENTION

The invention in one aspect is generally directed to control networks and to methods for configuring and operating networks for control, power distribution, and other applications.

In one aspect, a control network comprises a plurality of network nodes arranged in a plurality of tiers, the nodes including first-tier nodes and lower tier nodes. A master control bus interconnects the first-tier nodes, and a power source (for distributing relatively high power throughout the control network) is electronically coupled to the first-tier nodes. One or more lower-tier buses interconnect groups of the lower tier nodes. The lower-tier buses preferably include both data lines and a power source line derived from the power source. The lower tier nodes selectively distribute power from the power source line to local loads, by way of, e.g., controllable switches.

In various embodiments, a first-tier node may be embodied as a hub controller configured to be connected to one or more of said lower-tier buses. The hub controller may comprise a plurality of internal hub nodes integrated within the same physical unit. The internal hub nodes may comprise a hub master node adapted to interface with other first tier nodes over the master control bus, and one or more hub slave nodes adapted to interface with lower tier nodes using one of the lower-tier buses.

Further embodiments, variations and enhancements are also disclosed herein.

BRIEF DESCRIPTION OF THE DRAWINGS

FIG. 12 is a diagram showing one possible technique for physically connecting a network node, such as shown in FIG. 9A, within a control network.

FIG. 13 is a diagram of an alternative embodiment of a hub controller for use in a control network for distributing power and data signals.

DETAILED DESCRIPTION OF PREFERRED EMBODIMENTS

Figure 1:
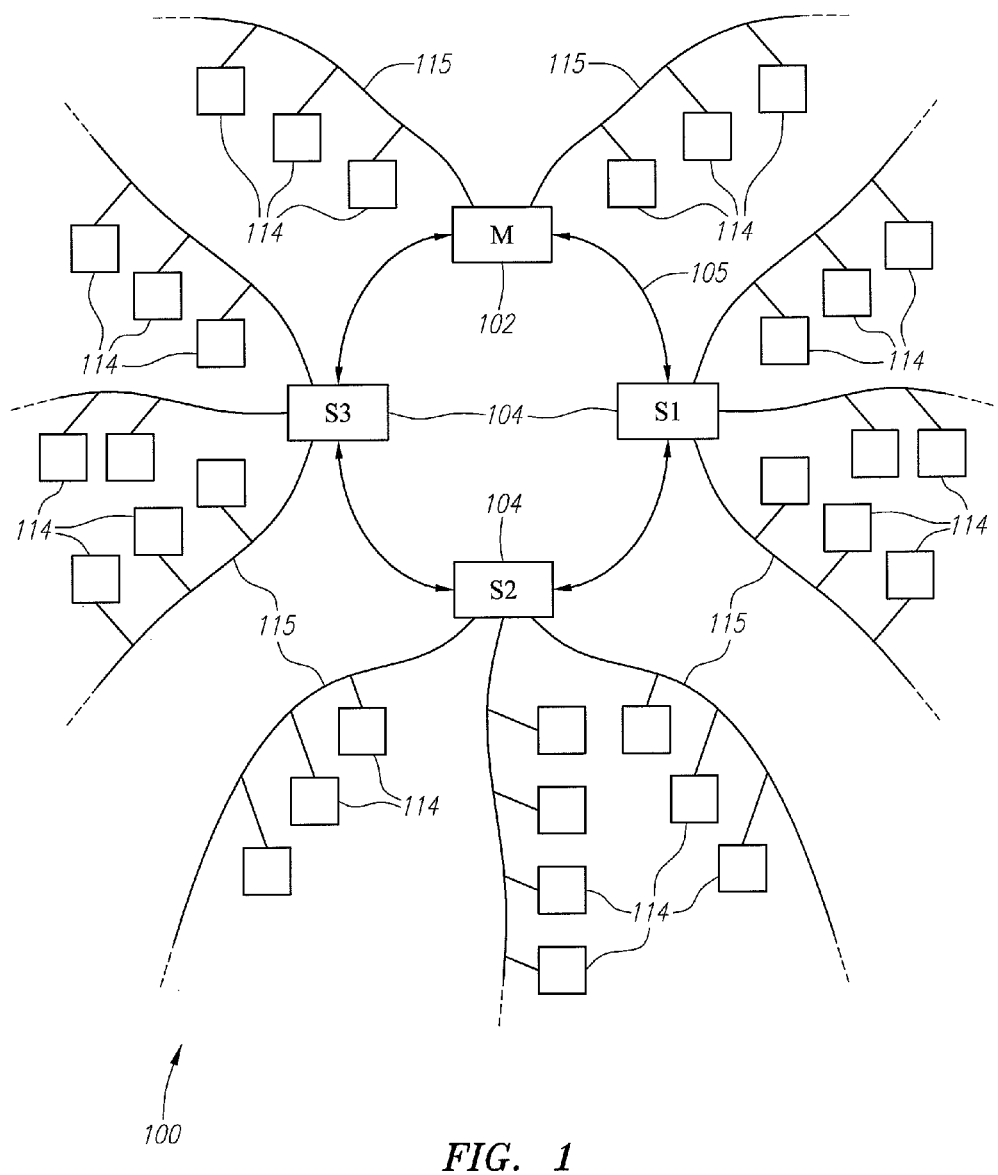
FIG. 1 is a conceptual diagram of a master-slave control network for distributing control and power signals throughout the network.

FIG. 1 is a conceptual diagram of a master-slave control network 100 for distributing control signals and power throughout the network 100 to various destinations. In the example shown in FIG. 1, the network 100 comprises a plurality of interconnected network hubs 102, 104, each of which may be connected to one or more nodes 114 over a variety of additional buses 115. The network hubs 102, 104 preferably are interconnected in a loop or ring configuration via a main bus 105 (which may comprise a number of bus segments interconnected between the various network hubs 102, 104 as illustrated). The network hubs 102, 104 may be physically arranged such that each of the network hubs 102, 104 controls a zone or general physical region of the instrumentality being controlled and/or supplied with power. Depending upon configuration and implementation, the network 100 may be used to control, e.g., vehicles, factories, buildings, robotic machinery, airplanes or other aircraft, ships or other watercraft, satellites, and so on.

In the example where the network hubs 102, 104 are connected in a loop or ring configuration, the main bus 105 preferably comprises one or more optical fibers which connect the various network hubs and carry data. In such an embodiment, each network hub 102, 104 may transmit a modulated optical signal having a frequency (or frequencies) that can be detected by downstream nodes. Data is transmitted from an originating hub 102, 104 to a destination hub by passing through each intervening hub along the main bus 105. The network hubs 102, 104 may support either unidirectional or bidirectional communication. As will be described in more detail in connection with various embodiments disclosed herein, power is preferably distributed over buses 115 (using, e.g., power wires bundled with data lines) and then locally applied to various loads by the nodes 114.

In a preferred embodiment, the control network 100 of FIG. 1 forms a multi-tier, hierarchical control architecture allowing flexible control and monitoring of the various network nodes 114. The control network 100 preferably includes both a top-tier master hub 102 (designated "M" in FIG. 1) and one or more top-tier slave hubs 104 (designated S1, S2 and S3 in this example, although there may be any number of slave hubs). The master hub 102 may control the various slave hubs 104, which in turn control the various lower-tier nodes 114.

Figure 2:
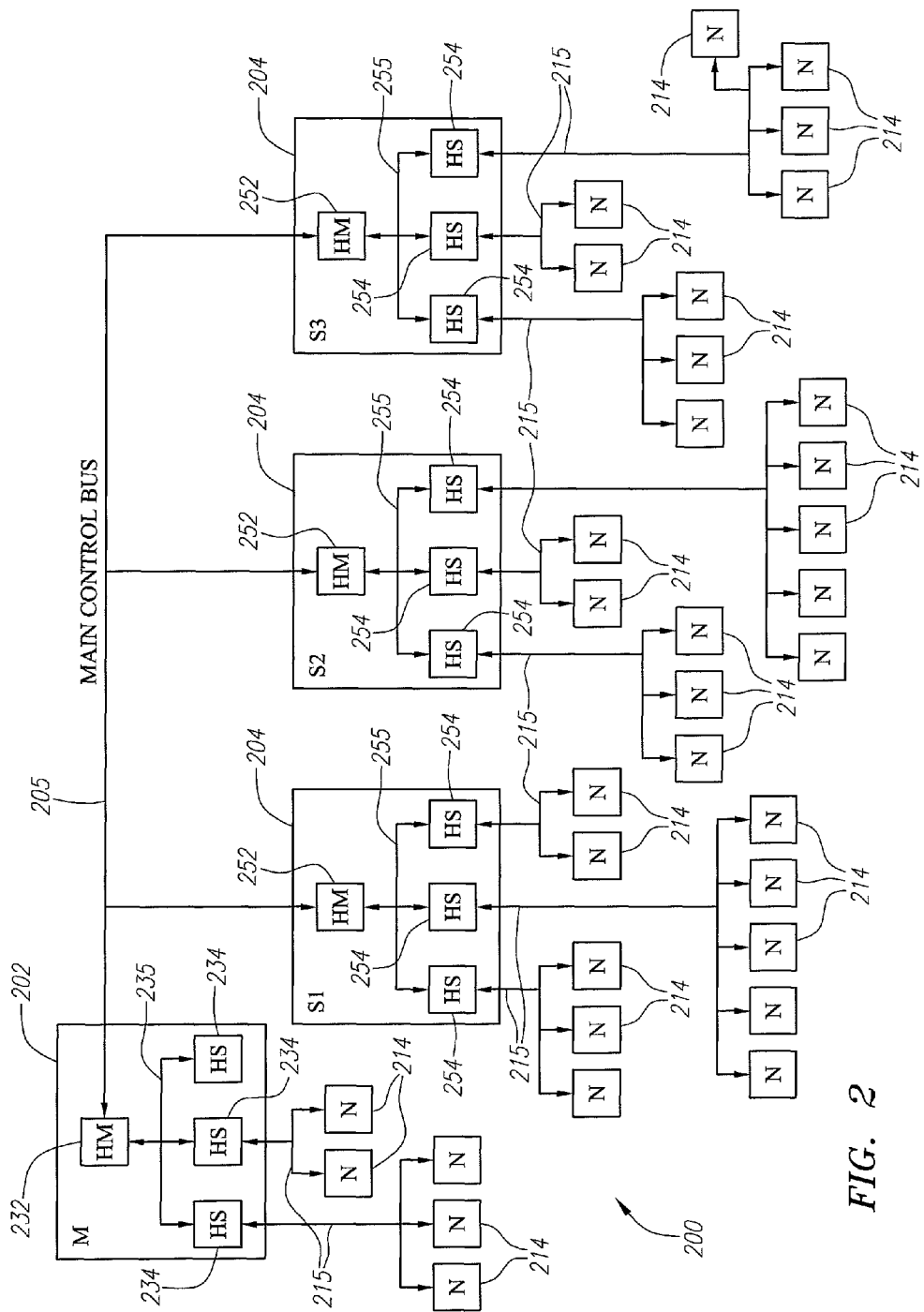
FIG. 2 is a high level diagram illustrating a hierarchy in accordance with one example of a master-slave control network.

FIG. 2 is a diagram illustrating a multi-tier, hierarchical control network 200 in accordance with one embodiment disclosed herein, and with the general principles of FIG. 1. As illustrated in FIG. 2, and similar to FIG. 1, the control network 200 comprises a plurality of interconnected network hubs 202, 204, each of which may be connected to one or more nodes 214 over a variety of additional buses 215. Although depicted as a single solid line in FIG. 2, the main bus 205 may comprise a fiber optic loop or ring as shown in FIG. 1, interconnecting the network hubs 202, 204.

As with FIG. 1, the control network 200 preferably includes both a top-tier master hub 202 (designated "M" in FIG. 2) and a plurality of top-tier slave hubs 204 (designated "S1", "S2" and "S3" in this example, although there may be any number of slave hubs). The top-tier master hub 202 may comprise a hub master node 232 (designated "HM" in FIG. 2) and one or more hub slave nodes 234 (designated "HS" in FIG. 2). Each of the top-tier slave hubs 204 may likewise comprise a hub master node 252 (also designated "HM") and one or more hub slave nodes 254 (also designated "HS"). Each of the hub slave nodes 234, 254 may be coupled to one or more network nodes 214 over additional buses 215. In a preferred embodiment, the hub slave nodes 234, 254 act in the capacity of a master with respect to the network nodes 214 to which they are coupled.

In one aspect, the control network 200 may comprise a multi-tier master-slave hierarchical control network. In a first tier, the top-tier master hub 202 ("M") generally controls the top-tier slave hubs 204 (i.e., "S1", "S2" and "S3"), and thereby indirectly controls the various network nodes 114. At a second tier, internal to the top-tier master hub 202, the hub master node 232 ("HM") controls (i.e., acts as a second-tier master with respect to) the hub slave nodes 234 ("HS"). Likewise, also at a second tier, and internal to the top-tier slave hubs 204, the hub master node 252 ("HM") controls (i.e., acts as a second-tier master with respect to) the hub slave nodes 254 ("HS"). At a third tier, each of the hub slave nodes 234, 254 may control (i.e., act as a third-tier master with respect to) the various network nodes 214 (i.e., third-tier slave nodes) to which they are coupled. Thus, the hub master nodes 232, 252 may serve a dual role, acting both as first-tier slave nodes and second-tier master nodes. Likewise, the hub slave nodes 234, 254 may also serve a dual role, acting both as second-tier slave nodes and third-tier master nodes. The resulting architecture may be viewed as a hierarchical, multi-tier master-slave control network.

According to one embodiment, each of the network hubs 202, 204 may include a variety of functionality, including an interface for inter-hub communication, an interface for communication to multiple slave nodes (i.e., network nodes 214), and a mechanism for distributing power (both low power and high power) to the various network nodes 214. According to a particular configuration, low power may be generally associated with the voltage level required by digital or logic circuitry, while high power may generally be associated with a voltage level higher than that required by the digital or logic circuitry. For example, low power may correspond to 5 volts, while high power may correspond to 12 or 24 volts.

Figure 3:
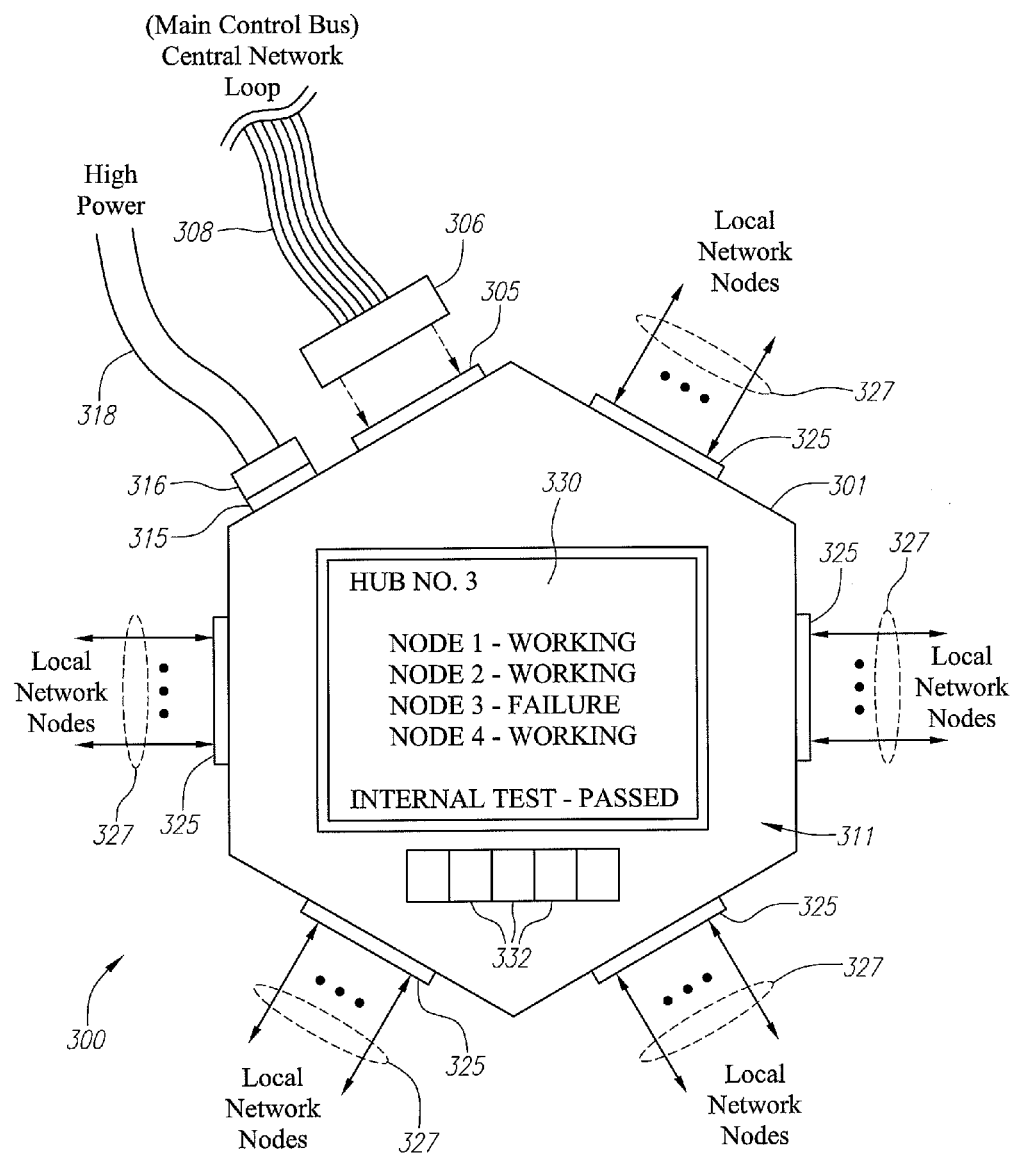
FIG. 3 is a diagram showing one embodiment of a power/data hub as may be used, for example, in the control network of FIG. 2 or otherwise.
Figure 4:
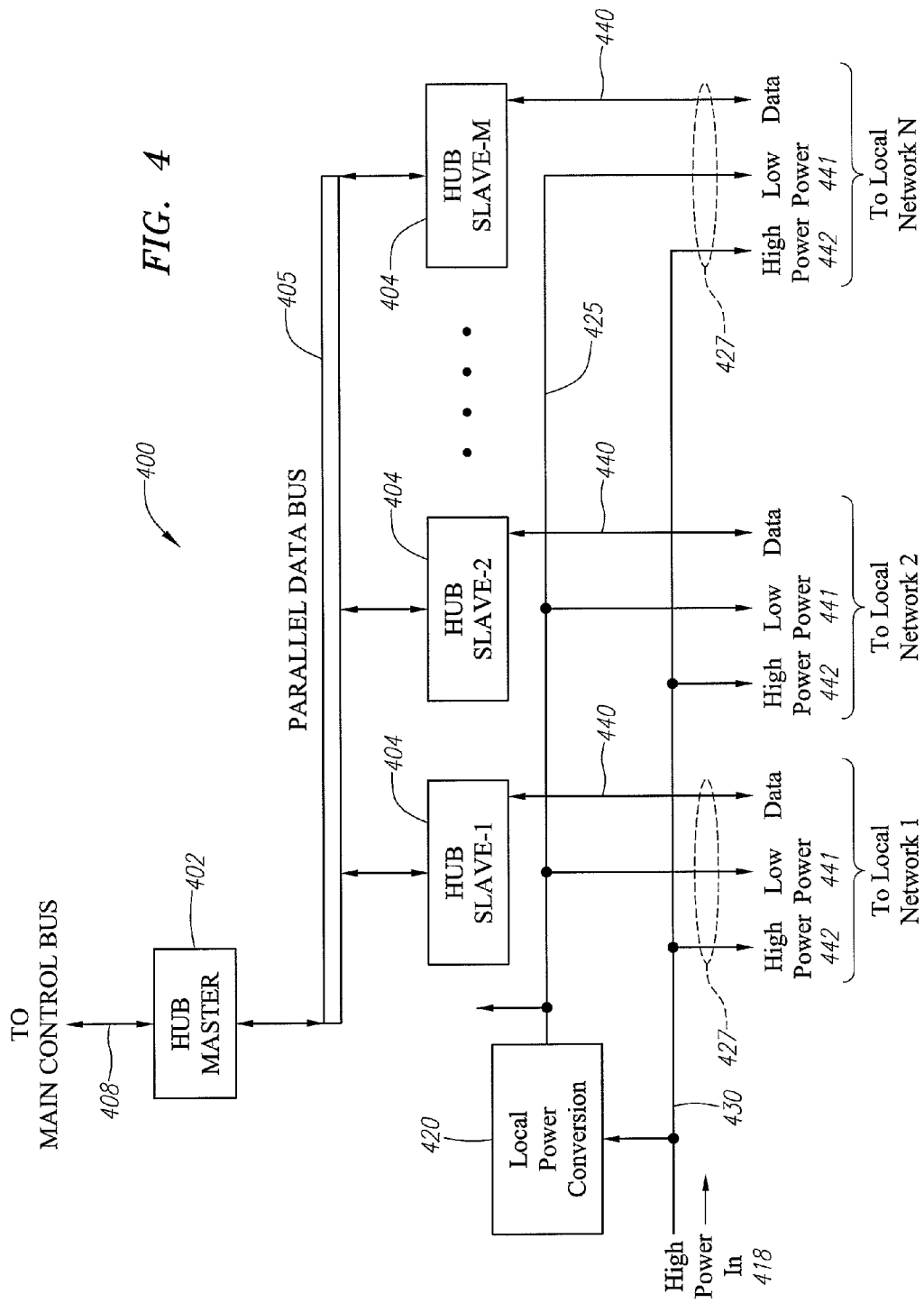
FIG. 4 is a diagram illustrating a master and slave nodes along with distribution of various power and data signals.
Figure 5:
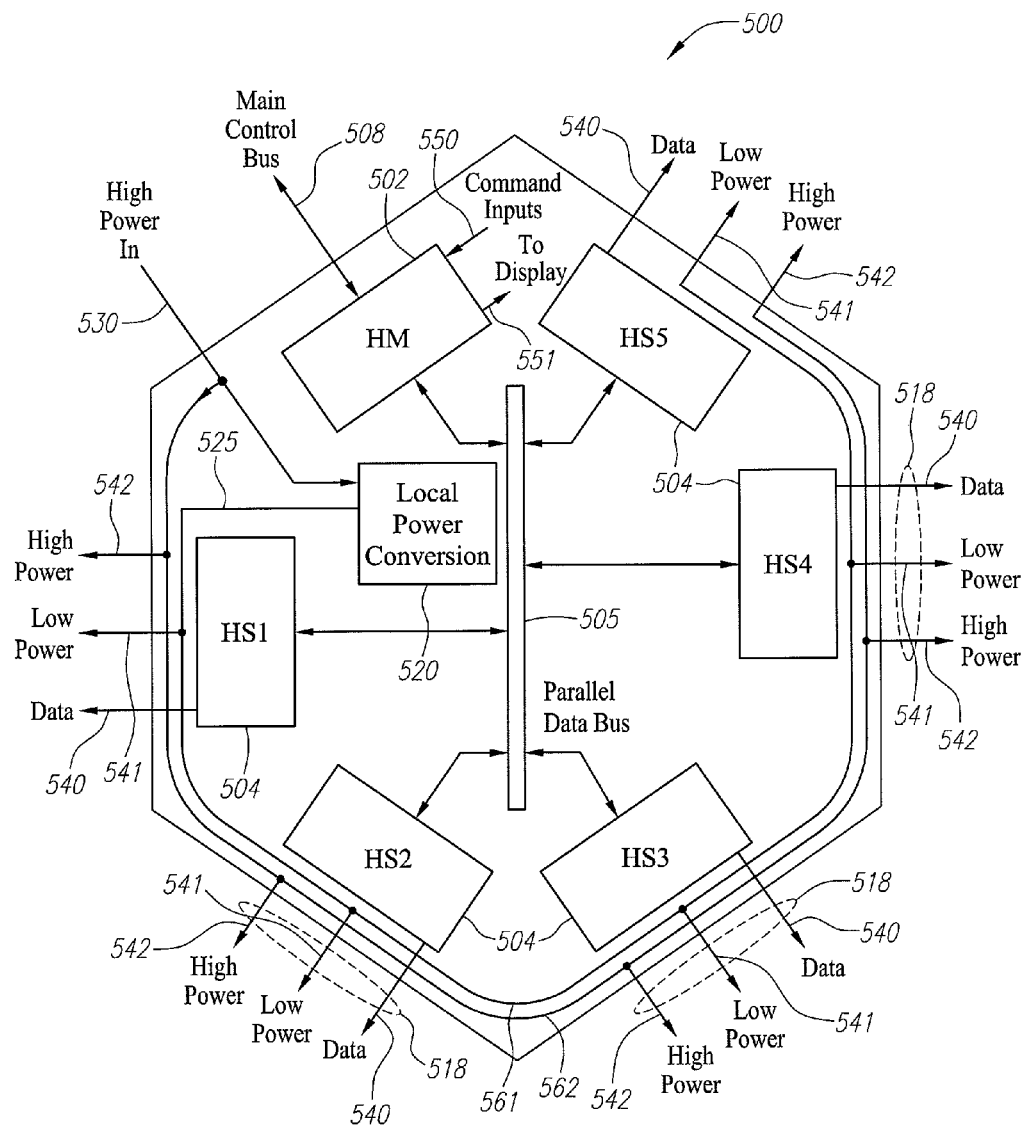
FIG. 5 is a more detailed block diagram of a power/data hub showing one possible internal arrangement of hub components.

Aspects of a preferred network hub are illustrated in FIGS. 3, 4 and 5. FIG. 3 is a diagram showing one embodiment of a power/data hub 300 as may be used, for example, as a network hub in the control network 100 or 200 or any other suitable network architecture. In FIG. 3, the power/data hub 300 is physically constructed of housing 301 having an outer shell or casing, and capable of connecting to a variety of buses. The power/data hub 300 in this example connects to a main control bus cable 308 (corresponding to, e.g., main control bus 105 or 205) through a bus terminal connector 306 which connects to a main bus connector 305 of the power/data hub 300. Similarly, various other bus cables (corresponding to additional buses 115 or 215 in FIG. 1 or 2, and depicted as signal lines 327 in FIG. 3) may be connected to bus connectors 325 of the power/data hub 300. A main power cable 318 may also be connected to the power/data hub 300 through a power terminal connector 316 which connects to a main power connector 315 of the power/data hub 300. In alternative embodiments, the main power cable 318 may be bundled or integrated with the main bus cable 308, and only a single bus/power connector could then be used (unless additional connectors are desired for ring/loop configuration or redundancy, as previously explained). The additional bus cables 327 may include a bundled or integrated power cable for distributed power to various network nodes (e.g., nodes 114 or 214 in FIG. 1 or 2), or alternatively a separate power cable may be provided running adjacent to the bus cables 327, for providing power to the network nodes.

Figure 20:
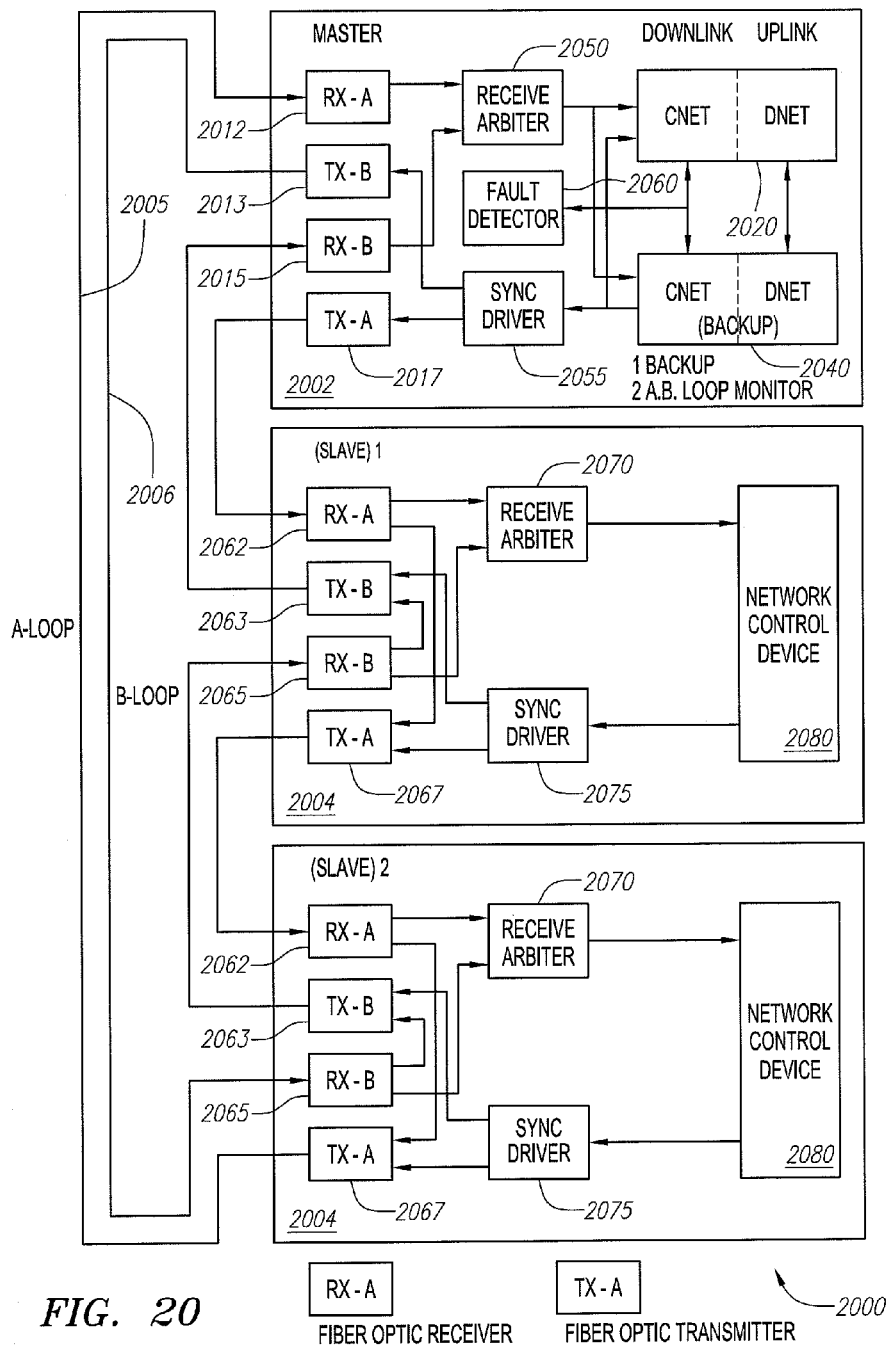
FIG. 20 is a diagram of a master-slave two-fiber ring network, showing certain node details, as may be used in connection with various principles and techniques described or illustrated herein.
Figure 21:
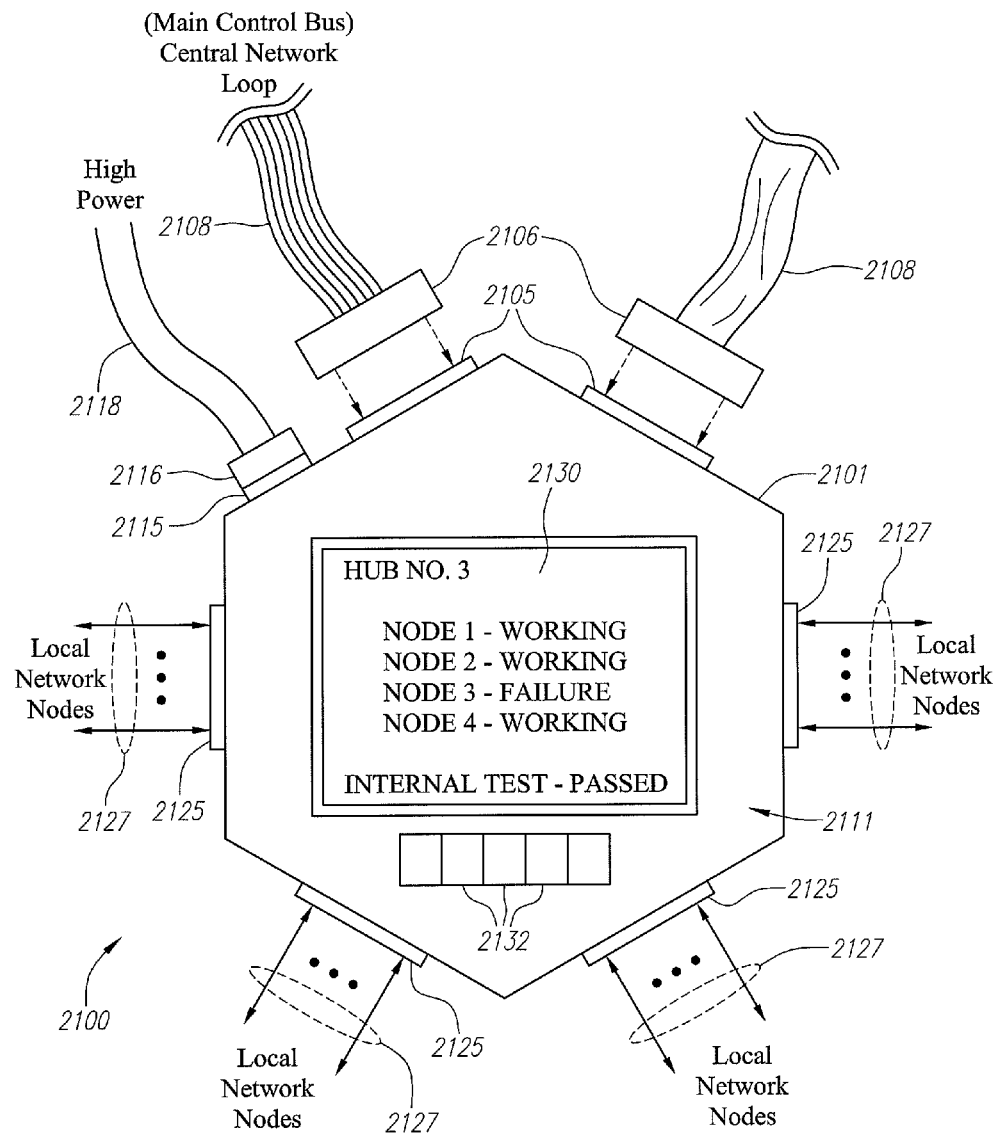
FIG. 21 is a diagram of another embodiment of a power/data hub as disclosed herein.

In other embodiments, the power/data hub 300 includes a second main bus connector 305 to facilitate the connection of the main bus in a loop or ring configuration. FIG. 21 illustrates an embodiment of a power/data hub 2100 similar to that shown in FIG. 3, wherein components labeled with reference numerals "21xx" in FIG. 21 generally correspond to components in FIG. 3 labeled with reference numerals "3xx", but illustrating two main bus cables 2108 connected to two main bus connectors 2105 of the power/data hub 2100. Alternatively, the main control bus cable 308 may be split, with signals being thereby connected to two (or more) different destinations. Also, in any of the foregoing embodiments, redundant bus cables may be provided to allow a dual-loop configuration, providing additional backup in case of a break in the cable or connection failure. A particular example of a dual-loop architecture is illustrated in FIG. 20, described later herein.

The physical shape of power/data hub 300 in FIG. 3 may be conducive to allowing multiple bus connections. In this particular example, the housing 301 is hexagonally shaped, allowing convenient bus connections on each of the six sides of the housing 301. Other shapes for the housing 301 may also be utilized—for example, square, pentagonal, octagonal, etc.; also the side corners may be rounded if desired. The bottom side (not visible in FIG. 3) of the housing 301 may be used for mounting the housing 301 to a solid frame or other surface, such as the frame of a bus, railcar, or vehicle. The top side 311, or any other suitable location, of the housing 301 may advantageously be outfitted with a user interface, in this example comprising a display 330 and a set of manual controls 332 (which may be embodied as buttons, knobs, switches, etc., or any combination thereof). The display 330 may provide a graphical indication of status information, and allow programming of, e.g., various node functions or monitoring parameters. In the example shown in FIG. 3, the display 330 identifies the power/data hub 300 as "Hub No. 3," and provides a status readout of each of the internal nodes (i.e., the hub master node and hub slave nodes). Using the manual controls 332, the power/data hub 300 may be further configured to display the status of individual network nodes relating to each of the hub nodes, to the extent that information is available at the power/hub node 300. The manual controls 332 may also be used to set certain features of functions of the various hub nodes or network nodes (e.g., to select which loads the network nodes should supply power to), to select what nodal parameters to monitor, and so on.

FIG. 13 illustrates an alternative embodiment of a power/data hub 1300 as may be used, for example, as a network hub in the control network 100 or 200 or any other suitable network architecture. In FIG. 13, as with FIG. 3, the power/data hub 1300 is physically constructed of housing 1301 having an outer shell or casing, and capable of connecting to a variety of buses. The power/data hub 1300 in this example is generally box-shaped, and connects to a main control bus cable 1308 (corresponding to, e.g., main control bus 105 or 205) through a main bus connector 1305. As described with respect to FIG. 3, a second main bus connector may be included to facilitate connection in a loop or ring configuration, and additional main bus connectors may be added for a redundant main control bus cable if desired. Other bus cables 1327 (corresponding to, e.g., additional buses 115 or 215 in FIG. 1 or 2) may be connected to bus connectors 1325 of the power/data hub 1300. A main power cable 1318 may also be connected to the power/data hub 1300 through a main power connector 1315. In alternative embodiments, the main power cable 1318 may be bundled or integrated with the main bus cable 1308, and only a single bus/power connector could then be used (unless additional connectors are desired for ring/loop configuration or redundancy, as previously explained). The additional bus cables 1327 may include a bundled or integrated power cable for distributed power to various network nodes (e.g., nodes 114 or 214 in FIG. 1 or 2), or alternatively a separate power cable may be provided running adjacent to the bus cables 1327, for providing power to the network nodes.

FIG. 4 is a diagram showing further configuration details including various power and data signals as may be provided by a hub controller 400 (such as power/data hub 300 or any of the other alternative hub controller embodiments described herein). In FIG. 4, a hub master node 402 (generally corresponding to hub master node 302 in FIG. 3) is communicatively coupled to various hub slave nodes 404 (generally corresponding to hub slave nodes 304 in FIG. 3) via a hub data bus 405, which preferably comprises a high speed data bus internal to the hub controller. The hub nodes 402, 404 are preferably housed within a hub controller enclosure such as housing 301 illustrated in FIG. 3, for example. The hub master node 402 connects to a main control bus 408, which may connect to additional hub controllers (not shown). Each of the hub slave nodes 404 may connect to various downstream network nodes (not shown in FIG. 4) through cables or other connection means, represented collectively as lines 427 in FIG. 4, including a high power output line 442, a low power output line 441, and a data bus 440 (which may be a parallel or serial data bus). The hub controller 400 preferably includes a power conversion unit 420 for converting incoming high power to low power for distribution over low power output lines 441. The lower power output may alleviate the need for downstream network nodes to perform their own power conversion or to receive low power wires from some other source. The hub controller 400 may directly provide the incoming high power signal 418 to the high power output lines 442 of the various other buses 427, subject to any type of current control or shutoff mechanism, or other safety circuitry, as may be desired. In this manner, both high and low power may be provided to the various network nodes connected to the hub controller 400.

Figure 6A:
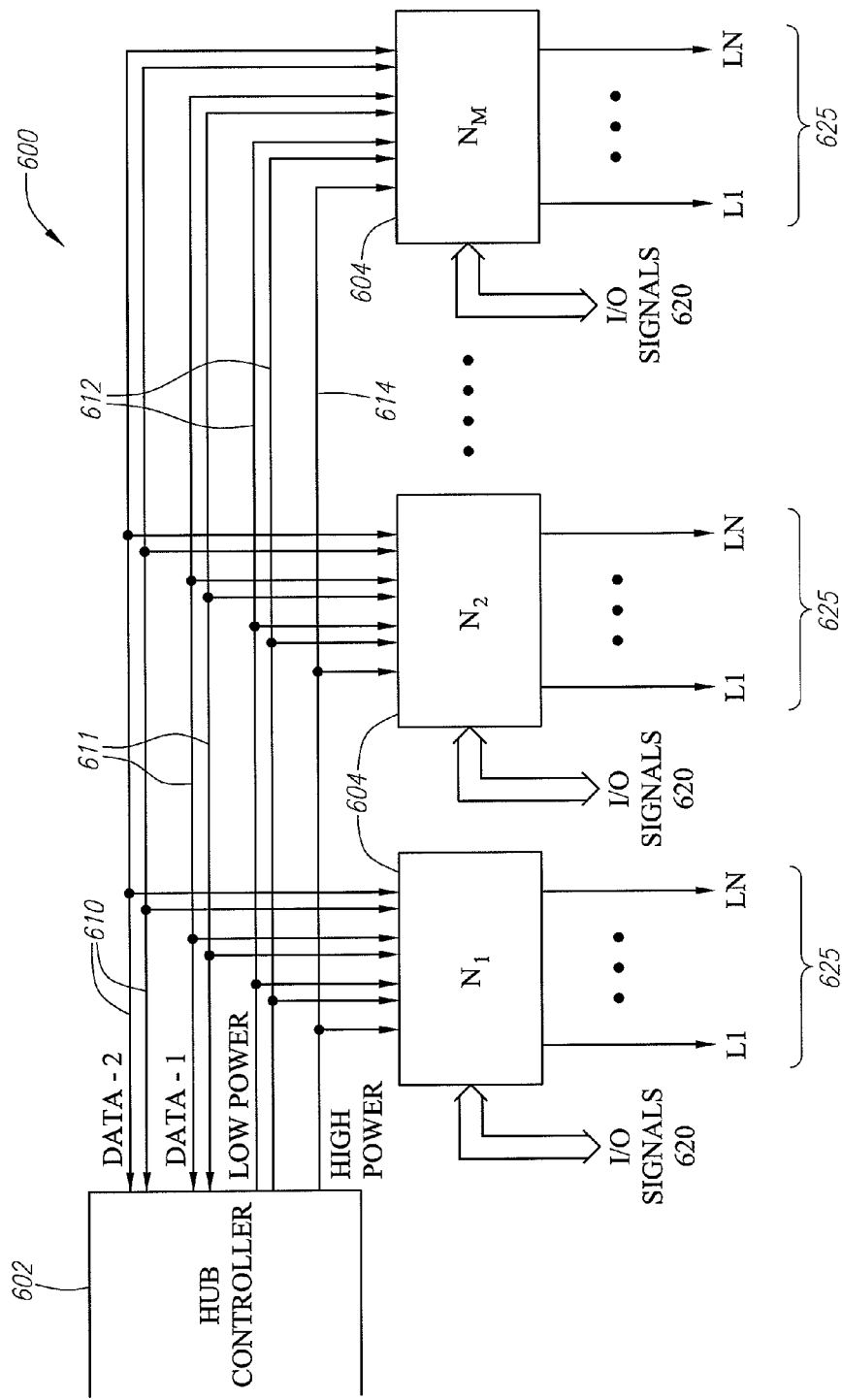
FIGS. 6A and 6B are diagrams illustrating possible alternative configurations for connection of a hub controller to various remote network nodes.
Figure 6B:
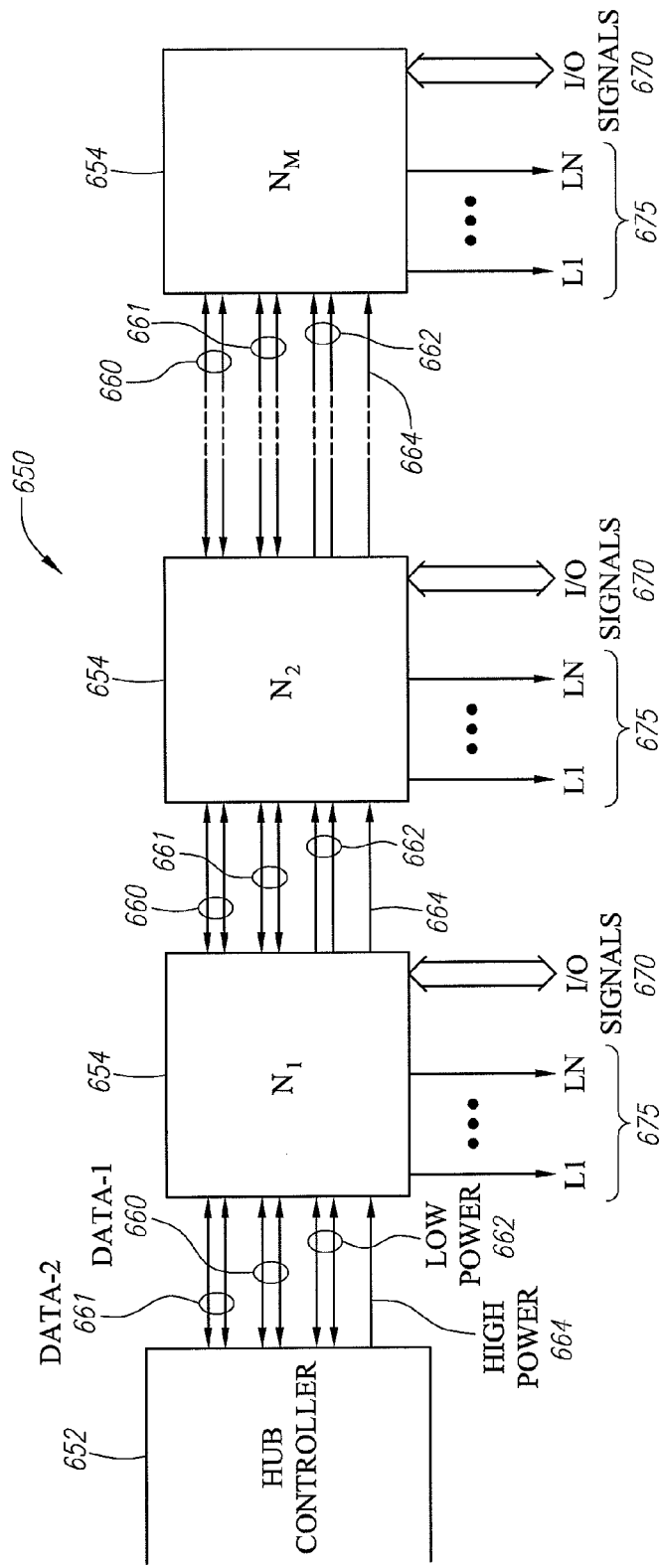
Figure 7:
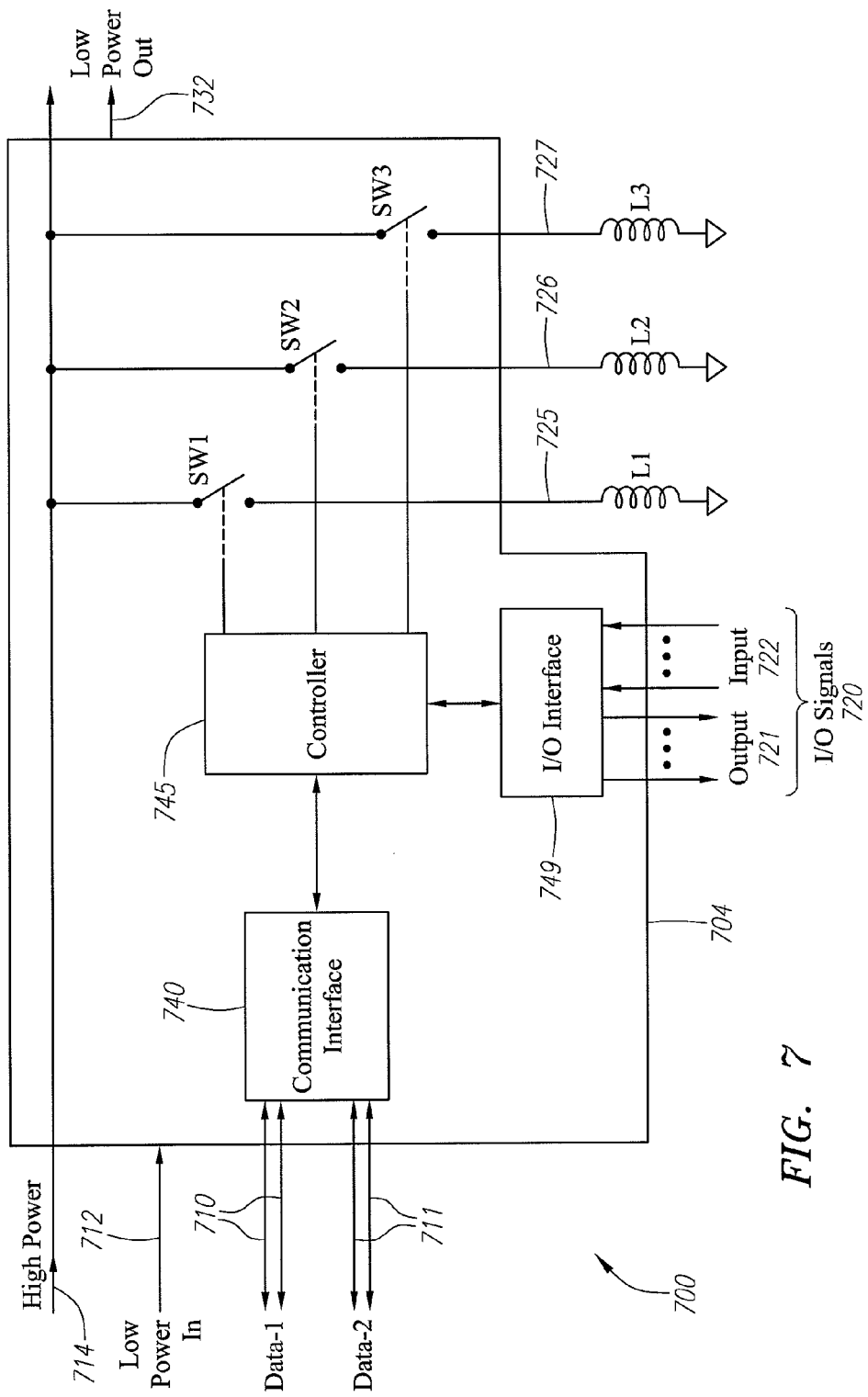
FIG. 7 is a block diagram of one embodiment of a network node, showing power and signal connections to various destinations.

FIGS. 6A and 6B are diagrams showing details of possible alternative configurations for connection of a hub slave node of a hub controller to various other network nodes, in a manner allowing the hub slave node of the hub controller to provide both data information and power selectively to various remote loads. In both examples of FIGS. 6A and 6B, redundant parallel data buses are utilized to increase reliability, although only a single data bus may be used in alternative embodiments. In FIG. 6A, a hub controller 602, which may be embodied as, e.g., power/data hub 302 in FIG. 3 or 402 in FIG. 4, communicates with various network nodes 604 over parallel data buses 610, 611 (which may comprise electrical wires and/or optical fibers). The hub controller 602 also provides low power signal line(s) 612, as well as a high power signal line 614, to the various network nodes 604. An additional high power line may be provided for the return path for the high power line 614, or else the return path may be through a grounded connection. Each of the network nodes 604 may control a number of local loads (including such things as motors, lights, switches, etc.). Each network node 604 may provide various input/output control signals 620 for interacting with local components in a conventional manner—for example, for turning on or off various components, checking status information, and the like. Each network node 604 also is capable of distributing high power to the local loads through power control lines 625 (generically designated "L1" through "LN" in FIG. 6A for controlling up to N local loads). One possible node configuration for supplying power to various local loads is illustrated in FIG. 7, described later herein.

FIG. 6B illustrates another possible configuration for connecting of a hub slave node of a hub controller to various network nodes, in a manner allowing the network node to selectively provide power to various local loads. The configuration of FIG. 6B is generally configured in a daisy-chain arrangement, but may also be suited for a ring or loop configuration if the last node connects back to the hub controller. As with FIG. 6A, redundant data buses are utilized to increase reliability, although only a single data bus may be used if desired. In FIG. 6B, a hub controller 652, which may be embodied as, e.g., power/data hub 302 in FIG. 3 or 402 in FIG. 4, communicates with various network nodes 654 over data buses 660, 661 (which may comprise electrical wires and/or optical fibers). Data signals are propagated along the various segments of data buses 660, 661 via the intervening network nodes 654. The hub controller 652 also provides low power signal line(s) 662, as well as a high power signal line 664, to the various network nodes 654. These lines are propagated along each of the network nodes 654 as well. As with FIG. 6A, an additional high power line may be provided for the return path for the high power line 664, or else the return path may be through a grounded connection. Each of the network nodes 654 may control a number of local loads, and may provide various input/output control signals 670 for interacting with local components in a conventional manner—for example, for turning on or off various components, checking status information, and the like. Each network node 654 also is capable of distributing high power to the local loads through power control lines 675 (generically designated "L1" through "LN" in FIG. 6B for controlling up to N local loads). One possible node configuration for supplying power to various local loads is similar to FIG. 7, described later herein, but with a pass-through communication interface (similar to that shown in FIG. 19 or 20, for example), allowing signals to be propagated (with manipulation or error detection if desired) along the chain of network nodes 654.

Additional details will now be described concerning a preferred hub controller configuration. FIG. 5 is a block diagram illustrated one possible arrangement of internal hub components of a power/data hub 500, and represents a potential embodiment of power/data hub 302 or 402. In FIG. 5, a hub master node 502 (generally corresponding to hub master node 302 in FIG. 3 or 402 in FIG. 4) is communicatively coupled to various hub slave nodes 504 (generally corresponding to hub slave nodes 304 in FIG. 3 or 404 in FIG. 4) via a hub data bus 505, which preferably comprises a high speed data bus internal to the hub controller 500. The hub nodes 502, 504 are preferably housed within a hub controller enclosure or housing such as 301 in FIG. 3. The hub master node 502 connects to a main control bus 508, which may connect to additional hub controllers (not shown). Each of the hub slave nodes 504 may connect to various downstream network nodes (not shown in FIG. 5) through cables or other connection means, represented collectively as lines 518 in FIG. 5. These connections may include a high power output line 542, a low power output line 541, and a data bus 540 (which may be a parallel or serial data bus). The hub controller 500 preferably includes a power conversion unit 520 for converting incoming high power to low power for distribution over low power output lines 541, and also for providing low power locally to the various hub nodes 502, 504. The hub controller 500 may directly provide the incoming high power signal 518 to the high power output lines 542 of the various other buses 518, subject to any type of current control or shutoff mechanism, or other safety circuitry, as may be desired. As with FIG. 4, in this manner both high and low power may be provided to the various network nodes connected to the hub controller 500.

The hub controller 500 may include an internal high power bus 562 and internal low power bus 562 for distributing high and low power, respectively, to the various downstream networks controlled by the hub slave nodes 504. In the situation where the hub controller 500 connects to two main data bus segments, the hub master node 502 may be connected to two output ports instead of a single one as illustrated in FIG. 5. In addition, any one of the hub nodes 502, 504, but preferably the hub master node 502, may include an interface for receiving command inputs 550 and outputting display data 551 to an external display (such as display 330 illustrated in FIG. 3).

Figure 14A:
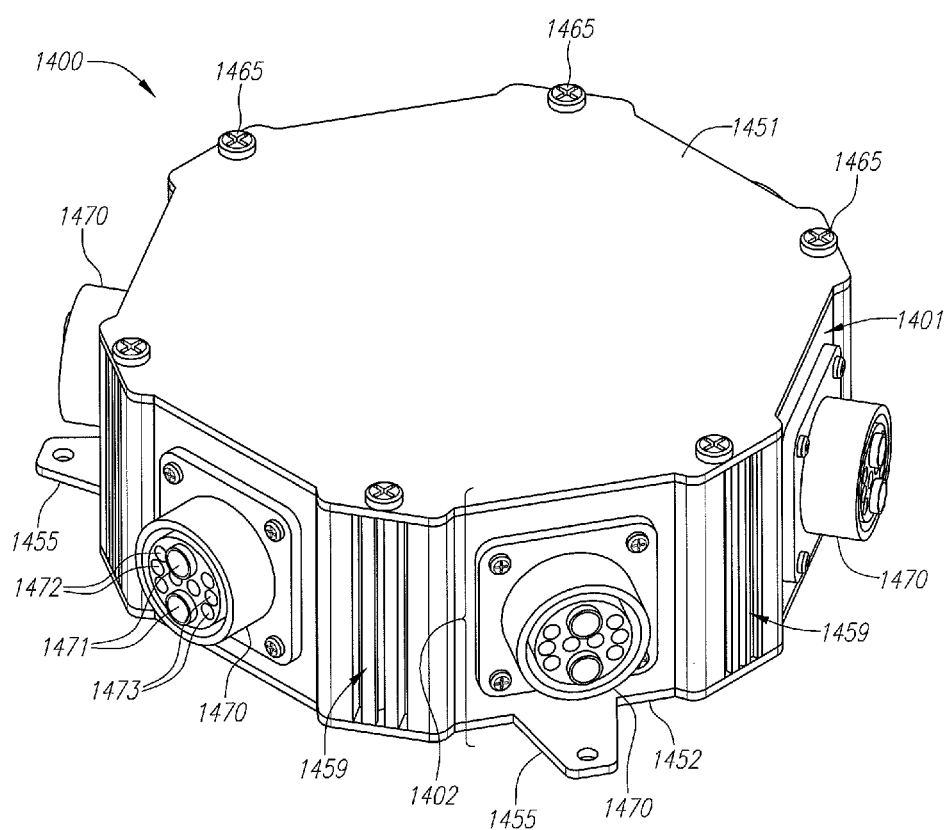
FIGS. 14A and 14B are oblique and top view diagrams, respectively, of a hub controller of the type illustrated, for example, in FIG. 5, and FIG. 14 C is an assembly diagram showing one possible technique for constructing and assembling the hub controller of FIGS. 14A and 14B.
Figure 14B:
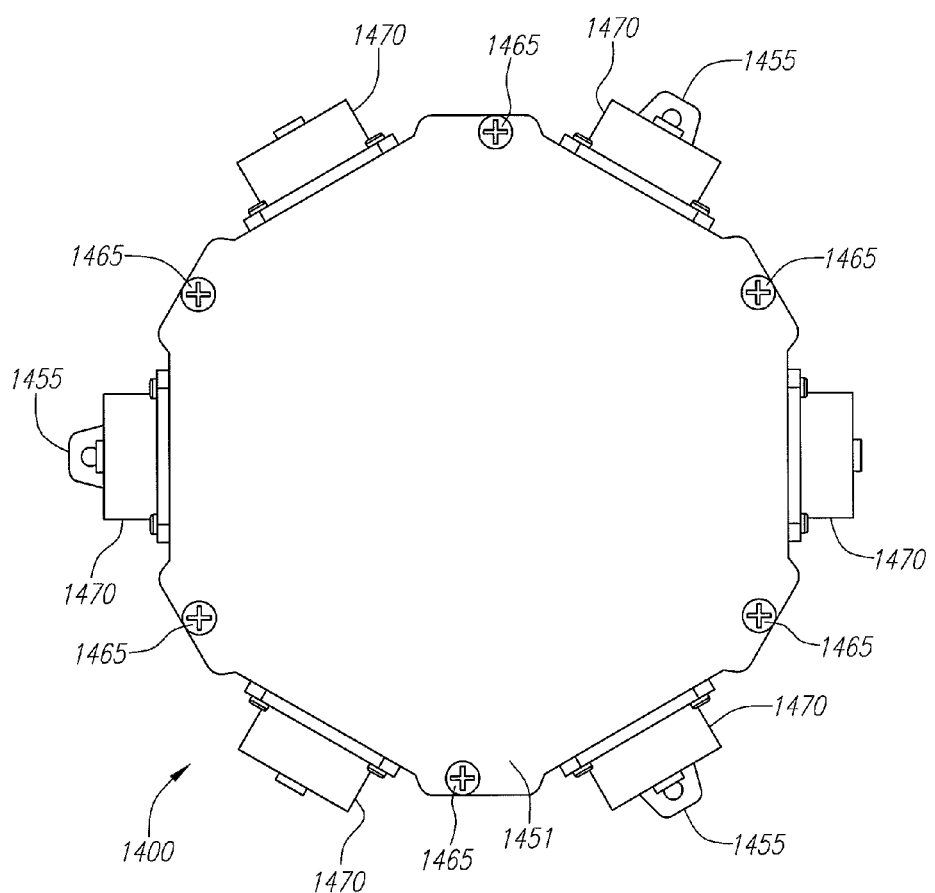
Figure 14C:
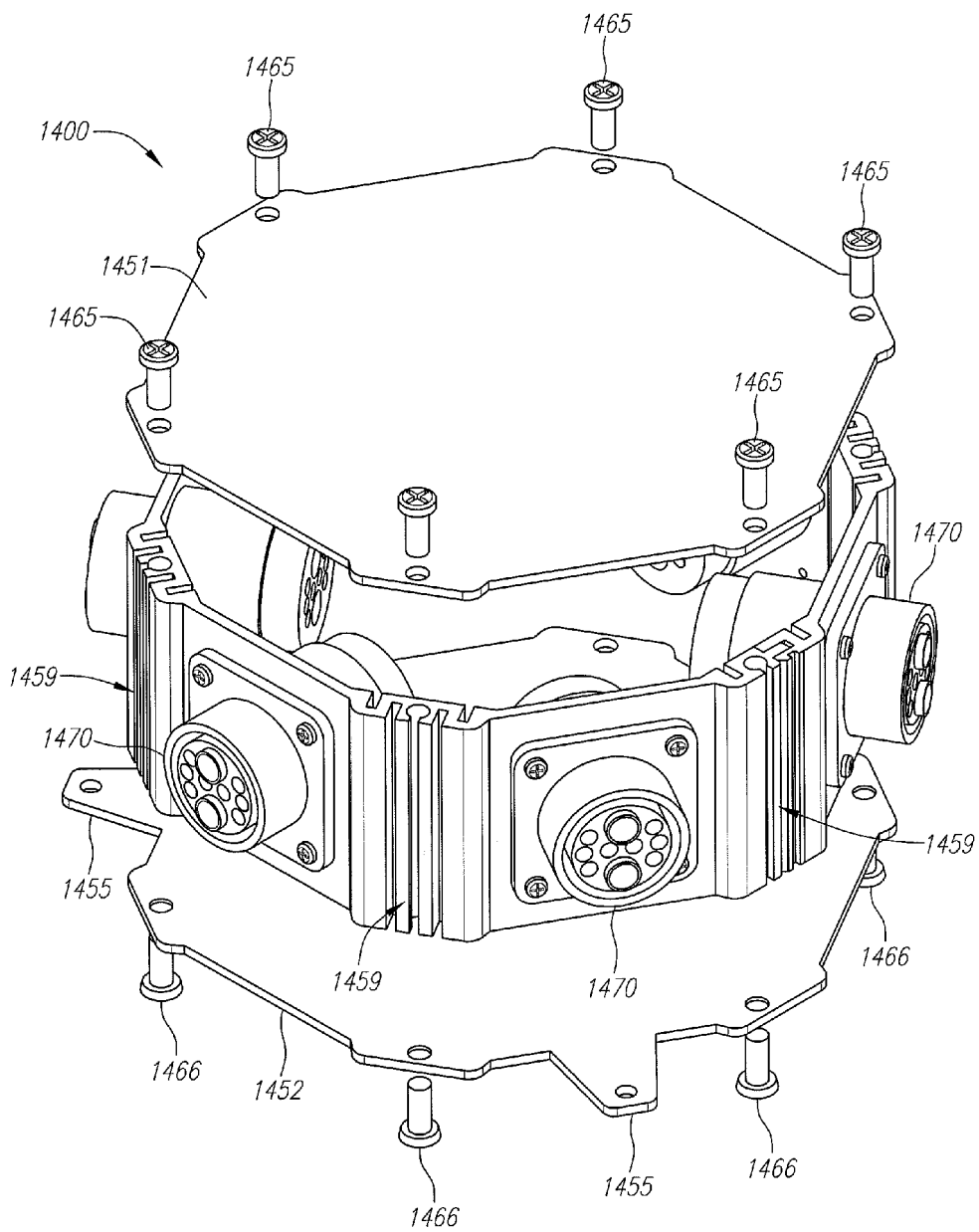

FIGS. 14A, 14B and 14C illustrate additional details of one possible physical implementation of a hub controller similar to power/data hub 302 illustrated in FIG. 3. FIG. 14A shows an oblique view of a hub controller 1400, while FIG. 14B shows a top view thereof. FIG. 14C is an assembly diagram illustrating the various components that may be used to form the hub controller 1400 depicted in FIGS. 14A and 14B.

Turning first to FIG. 14A, a hub controller 1400 may comprise a housing 1402 of generally octagonal shape, although it may alternatively take on other shapes and sizes as mentioned previously with respect to FIG. 3. The housing 1402 may be constructed of any suitable material, and may comprise a rugged lightweight material such as aluminum that provides environmental protection and allows for heat dissipation. In other types of control environments, different types of housings or materials (such as plastic, ceramics, metal composites, or any combination thereof) may be used. The housing 1402 may encase the circuitry and electronics of the hub controller 1400, including the various hub nodes (such as, e.g., hub nodes 302, 304 illustrated in FIG. 3). As further illustrated in FIGS. 14A and 14C, the housing 1402 may have heat dissipating members (e.g., fins) 1459 to facilitate cooling of the hub controller 1400. The housing 1402 may include a top housing plate 1451 and a bottom housing plate 1452, each of which is secured to a center housing frame 1401 by any suitable fastening means, such as screws 1465 and 1466. In the particular example illustrated, the bottom housing plate 1452 includes tabs 1455 allowing the hub controller 1400 to be conveniently mounted to a vehicle frame or other appropriate surface with suitable fastening means, such as screws.

Around the perimeter of the center housing frame 1401, along each individual sidewall, are bus connectors 1470 preferably designed to allow ready coupling of network power/data cables (not shown). The bus connectors 1470 in this particular embodiment allow for bundling of power and data lines in a single cable. Accordingly, each bus connector 1470 includes one or more power line connector(s) 1471 (for high power), as well as a variety of data line connectors 1472, 1473 (which may connect both data and low power in certain embodiments). Cables connected to bus connectors 1470 may carry both data signals and power to various downstream network nodes (not shown in FIGS. 14A-14C). The bus connector for the main control bus may have a similar bus connector 1470, or else may comprise a different set of signal connectors depending upon the nature of the main control bus. Inter-hub cables used to connect various hub controllers may need to be thicker than the cables connected to other network nodes, as they may have a larger power draw (depending upon the system configuration).

According to certain embodiments, bus connectors 1470 are connected to other hubs or nodes using a split cable (not shown), with the high power line connectors 1471 in this example being split different directions, and with data line connectors 1472, 1473 also being split different directions. Such a configuration facilitates connection of the various hubs and nodes in a loop or ring architecture. When a hub master or slave node (e.g., 502 or 504 shown in FIG. 5) is in a listening mode, it may pass through signals received via data line connectors 1472 to the other data line connectors 1473 for propagation to the next hub or node downstream, and vice versa. This action allows signals to be transmitted around a ring or loop of hubs or nodes. When a hub master or slave node is in an active transmission mode, it may transmit signals both directions—i.e., using both data connectors 1472, 1473. Further possible techniques relating to ring or loop communication, as may be used in connection with hub controller 1400, are described with respect to FIGS. 18-20 later herein.

Although not illustrated in FIGS. 14A-14C, the top housing plate 1451 (or any other suitable portion) of the hub controller 1400 may include manual controls and/or a display, similar to the power/data hub 302 illustrated in FIG. 3.

Additional details will now be provided concerning various possible embodiments of network nodes as may be used in connection with various embodiments as described herein. FIG. 7 is a block diagram of one embodiment of a network node 700, showing power and signal connections to various destinations. In the particular example of FIG. 7, the network node 700 transmits and receives data signals over data buses 710, 711, and receives a high power input line 714 and a low power input line 712. Data buses 710, 711, high power input line 714, and low power input line 712 may be connected upstream to a hub controller or, depending upon the system configuration, may be connected to an upstream node or series of nodes which eventually reach the hub controller. The network node 700, among other things, selectively provides high power to various loads (designated as "L1", "L2" and "L3" in FIG. 7). The network node 700 may also receive input signals 722 and generate output signals 721 in a conventional manner to control, monitor or otherwise interact with various network components. If arranged in a daisy chain configuration, or otherwise desired, the network node 700 may pass through the high power input line 714 as an output, and may likewise pass through the low power input line 712 as an output 732.

As further illustrated in the example shown in FIG. 7, the network node 700 comprises a communication interface 740, a controller 745, an input/output interface 749, and a set of high power switches (designated "SW1", "SW2", and "SW3" in FIG. 7). The communication interface 740 is responsible for communicating with the hub controller and/or the upstream or downstream network nodes. The bus connections to the communication interface 740 depend upon the system architecture. In this example, the two data buses 710 and 711 may generally correspond to data buses 610 and 611 depicted in FIG. 6A. In a configuration such as shown in FIG. 6B, two additional data bus connections may be provided with communication interface 740. Control of the network node 700 is generally provided by controller 745, which may comprise, e.g., a microprocessor or other suitable circuitry or electronics. The controller 745 interprets any commands received via the communication interface 740, and responds as necessary by transmitting responsive data or information via communication interface 740 to the appropriate destination. The controller 745 is also preferably responsible for transmitting the various output signals 721 and receiving and interpreting the various input signals 722, via input/output interface 749.

The controller 745 also preferably responds to commands received from the hub controller or otherwise (e.g., an upstream node or programmed by way of manual controls) to selectively provide power to the various loads L1, L2 and L3. In response to received commands, the controller 745 selectively actuates switches SW1, SW2 and SW3, thereby connecting power to or disconnecting power from the individual loads L1, L2 and L3. The controller 745 may also monitor the status of the switches SW1, SW2 and SW3, and record or report this information to the hub controller or an upstream node.

Figure 8:
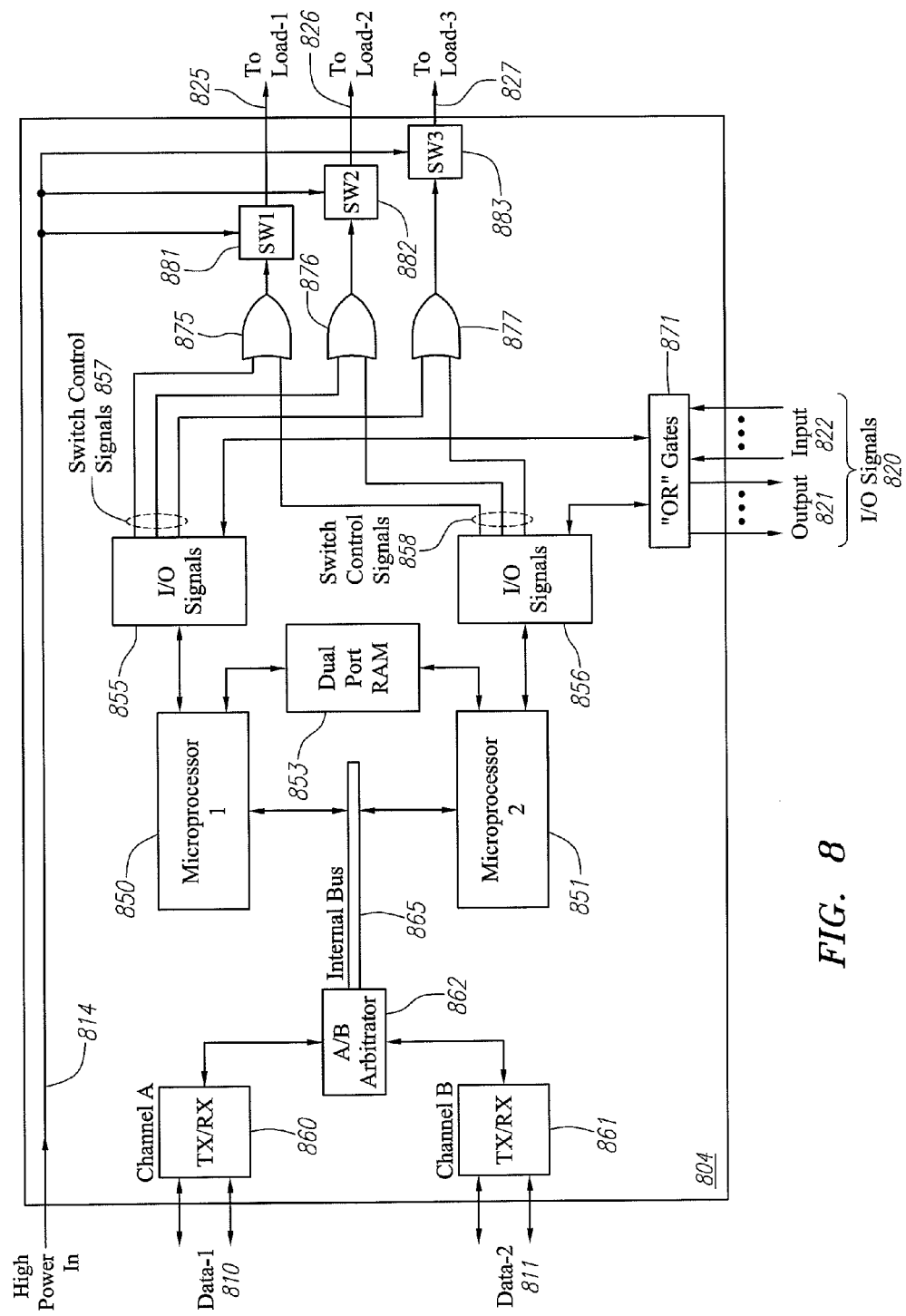
FIG. 8 is a more detailed diagram of an example of a network node as may be constructed in accordance with the basic architecture of FIG. 7, showing further possible implementation details.

FIG. 8 is a more detailed diagram of an example of a network node 804 as may be constructed in accordance with the basic architecture of FIG. 7, showing further possible implementation details. As shown in FIG. 8, this particular network node 804 includes redundant processors 850, 851 (which may be embodied as conventional microprocessors) acting as the controller for the network node 800, in order to, e.g., increase reliability. The communication interface of the network node 804 comprises a first transceiver 860 for communicating over the first data bus 810 ("channel A"), and a second transceiver 861 for communicating over the second data bus 811 ("channel B"). A channel selection circuit 862 selects between incoming signals received by transceivers 860, 861. Similar signals may be received over data buses 810, 811 when, e.g., the data buses 810, 811 are being used for redundant communication, or when the node 804 is configured with other nodes (typically including a hub) in a ring or loop configuration. In the case where similar signals may be received over both data buses 810, 811, the channel selection circuit 862 arbitrates and may, for example, select the best quality signal.

The node 804 may comprise an internal bus 865 for facilitating communication by processors 850, 851 with other node components, such as channel selection circuit 862. The processors 850, 851 may utilize a dual port random-access memory (RAM) 853 to facilitate processing, and, if desired, to allow communication between the two processors 850, 851. The processors 850, 851 interpret any commands received via data buses 810, 811, and respond as necessary by transmitting responsive data or information via the data buses 810, 811. The processors 850, 851 are also preferably responsible for transmitting the various output signals 821 and receiving and interpreting the various input signals 822 from devices under control or being monitored by the node 804. As the processors 850, 851 are intended to be redundant, each of the processors 850, 851 has a set of input/output signals 855 and 856, respectively, a subset of which include switch control signals 857 and 858. Output signals from either processor 850, 851 may drive the node output signals 821 (via logic gates 871), while input signals 822 are sent to both processors 850, 851. Similarly, switch control signals 857, 858 are combined by logic gates 875, 876, 877, allowing either processor 850, 851 to control the switches 881, 882, 883, and thereby provide power to various loads.

Similar to the node in FIG. 7, the processors 850, 851 preferably respond to commands received from the hub controller or otherwise (e.g., an upstream node or programmed by way of manual controls) to selectively provide power to the various loads by selectively actuating switches 881, 882, 883 (also designated SW1, SW2 and SW3 in FIG. 8), thereby connecting power to or disconnecting power from the individual loads. Switches 881, 882, 883 may be embodied as, e.g., high power transistors (such as high power FETs). The processors 850, 851 may also monitor the status of the switches SW1, SW2 and SW3, and record or report this information to the hub controller or an upstream node. Although three switches SW1, SW2 and SW3 are illustrated in FIG. 8, any number of switches may be present.

According to certain embodiments, data buses 810, 811 are connected to two different nodes (one of which may be a hub), and transmit and/or receive signals propagated around a ring or loop. When the node 804 is in a listening mode, it may pass through signals received by data bus 810 to the other data bus 811, and vice versa. This action allows signals to be transmitted around a ring or loop of hubs or nodes. When the node 804 is in an active transmission mode, it may transmit signals both directions—i.e., using both data buses 810, 811. Further possible techniques relating to ring or loop communication, as may be used in connection with node 804, are described with respect to FIGS. 18-20 later herein.

Although not illustrated in FIG. 8, the node 804 may also receive a low power source line from an upstream hub or node (as previously described with respect to FIG. 7), and may propagate the low power source line to a downstream node.

Figure 9A:
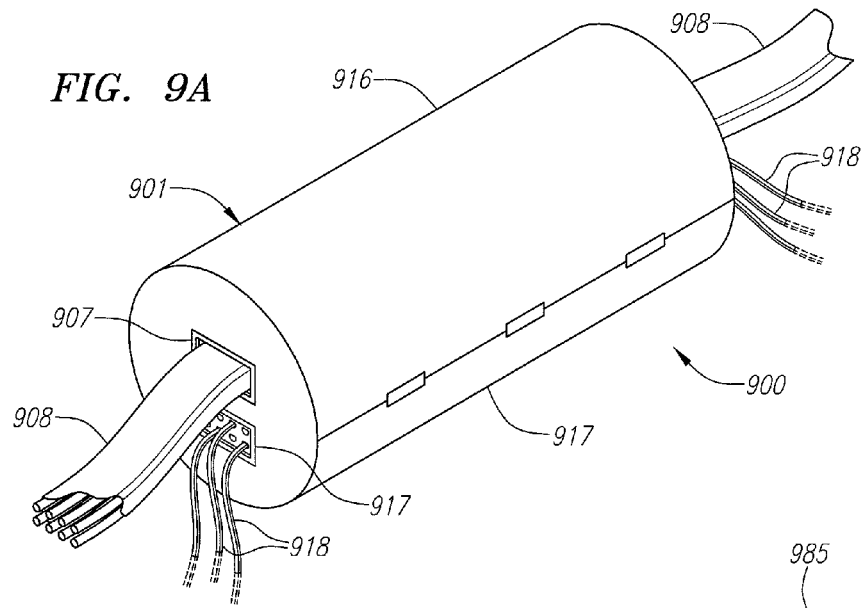
FIG. 9A is a diagram of one possible network node housing.
Figure 9B:
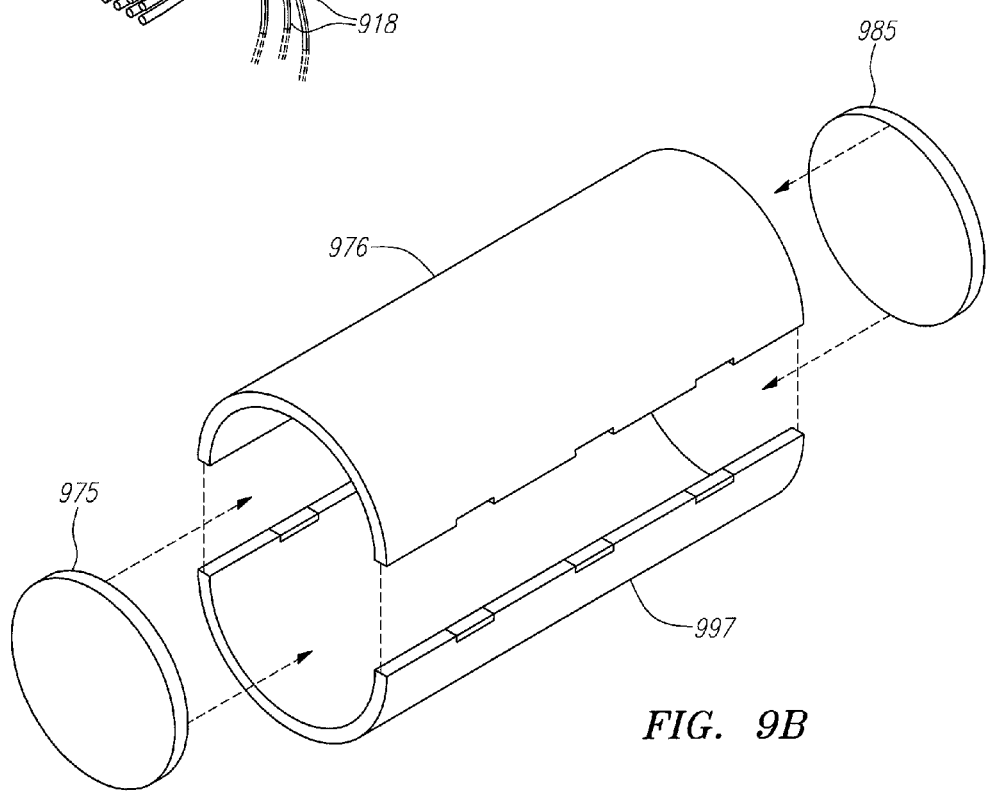
FIGS. 9B and 9C are exploded view diagrams showing two possible techniques for constructing and assembling the housing of FIG. 9A.
Figure 9C:
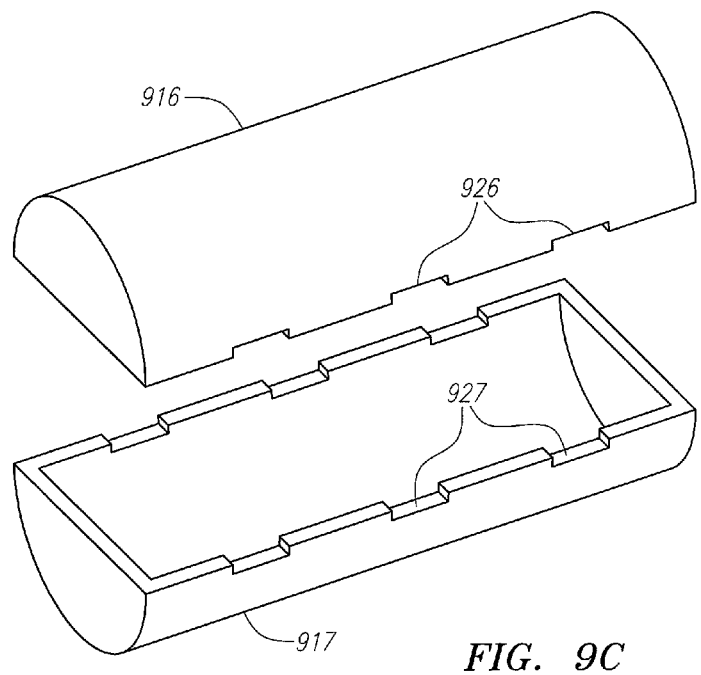

The various network nodes as described herein (e.g., in FIG. 7 or 8) may be physically constructed in a variety of different manners. FIG. 9A shows one possible network node housing 901 for a node 900, generally cylindrical in shape, and having two mating semi-cylindrical plates 916, 917 that may be assembled as depicted in FIG. 9C. Alternatively, the housing 901 may comprise semi-cylindrical plates 976, 977 with separate end pieces 975, 985, as illustrated in FIG. 9B (with certain details such as cable connections omitted). The node housing 901 in the example of FIG. 9A has two bus connectors 907 on opposite sides of the node housing 901, each of which is adapted to receive a cable 908 containing signal lines that are carried from node to node. The node housing 901 also includes one or more input/output line connectors 917 for connecting to various input/output lines 918, allowing the node 900 to control various local devices.

Figure 10:
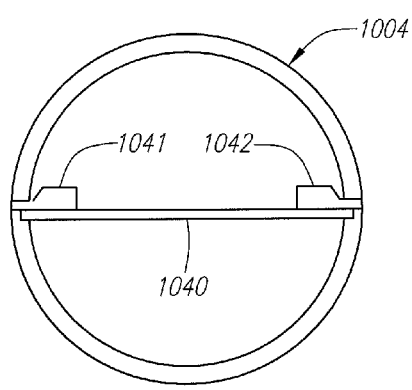
FIGS. 10 and 11 are diagrams illustrating cross-sectional views in accordance with different variations of the network node housing illustrated in FIG. 9A.
Figure 11:
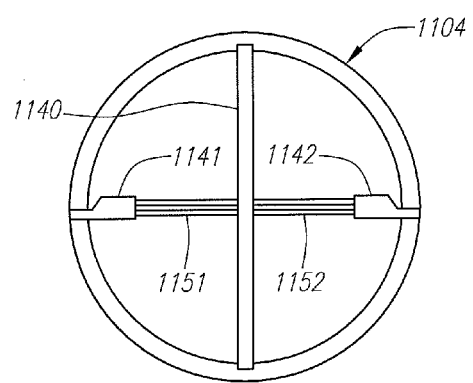

As depicted in FIG. 9C, the top and bottom plates 916, 917 of the node housing preferably have narrow cutouts 926 and 927, respectively, which align together and conform to the shape of high power transistors (typically high power field effect transistors or FETs) which may provide output power to various local devices. The high power transistors may be one possible embodiment of switches SW1, SW2, SW3 as depicted in FIG. 7 or 8. The high power transistors may be attached to a circuit board internal to the node housing 804. Two possible configurations of attaching and securing the high power transistors are illustrated in FIGS. 10 and 11. FIG. 10 illustrates a cross-sectional view of a node housing 1004 encasing a circuit board 1040 which may be secured to the node housing 1004 in part by internal cutout grooves inside the node housing 1004. High power transistors 1041, 1042 are attached to the circuit board 1040, and may be positioned such that they are secured in part by being clamped within the gaps defined by cutouts 926, 927 in FIG. 9C. Preferably the gaps defined by cutouts 926, 927 conform to the contours of high power transistors 1041, 1042, so that no break in the seal of the housing plates 916, 917 occurs.

FIG. 11 illustrates a cross-sectional view of another node housing 1104 showing another possible means for attaching and securing high power transistors within the node housing 1104. As shown in FIG. 11, a circuit board 1140 is mounted perpendicularly with respect to the plane where the two facing housing plates 916, 917 meet. The circuit board 1140 may be secured to the node housing 1104 in part by internal cutout grooves inside the node housing 1104, as illustrated. High power transistors 1141, 1142 are attached to the circuit board 1140 via legs 1151, 1152, and, as with FIG. 10, may be positioned such that they are secured in part by being clamped within the gaps defined by cutouts 926, 927 in FIG. 9C. Preferably the gaps defined by cutouts 926, 927 conform to the contours of high power transistors 1141, 1142, so that no break in the seal of the housing plates 916, 917 occurs.

In the examples of FIGS. 9A-9C, 10 and 11, the node housing 904, 1004 or 1104 may provide significant advantages for dissipation of heat generated by the high power transistors. The node housing 904 is thus preferably constructed of a lightweight material such as aluminum that provides environmental protection and allows for heat dissipation, although different types of housings or materials (such as plastic, ceramics, metal composites, or any combination thereof) may be used in whole or part. The contact of the high power transistors 1041, 1042 or 1141, 1142 with the node housing 904, 1004 or 1104 helps facilitate transfer and dissipation of heat generated by the high power transistors.

FIG. 12 is a diagram showing one possible technique for physically connecting a network node, such as shown in FIG. 9A (or FIG. 10 or 11), within a control network. As illustrated in FIG. 12, a node 1201 is physically attached to a cable harness 1214 by any suitable securing means such as straps 1299 that may be comprised of, e.g., heavy duty duct tape, vinyl, fabric, rubber, or any other appropriate material. Bus cables 1208 may connect to both sides of the node 1201, and may likewise be strapped or otherwise physically bundled with the cable harness 1214. A large number of nodes 1201 may thereby be conveniently dispersed throughout a network environment, using pre-existing cabling paths.

Figure 15A:
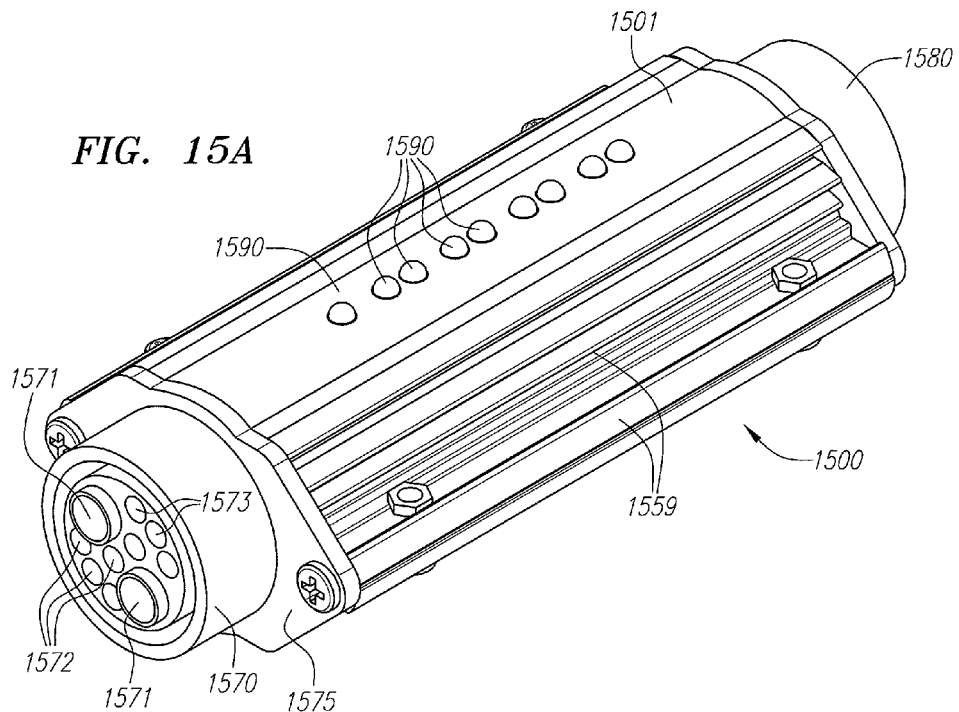
FIGS. 15A through 15F are more detailed diagrams of one possible embodiment of a network node in general accordance with the principles illustrated in and described with respect to FIG. 9A.
Figure 15B:
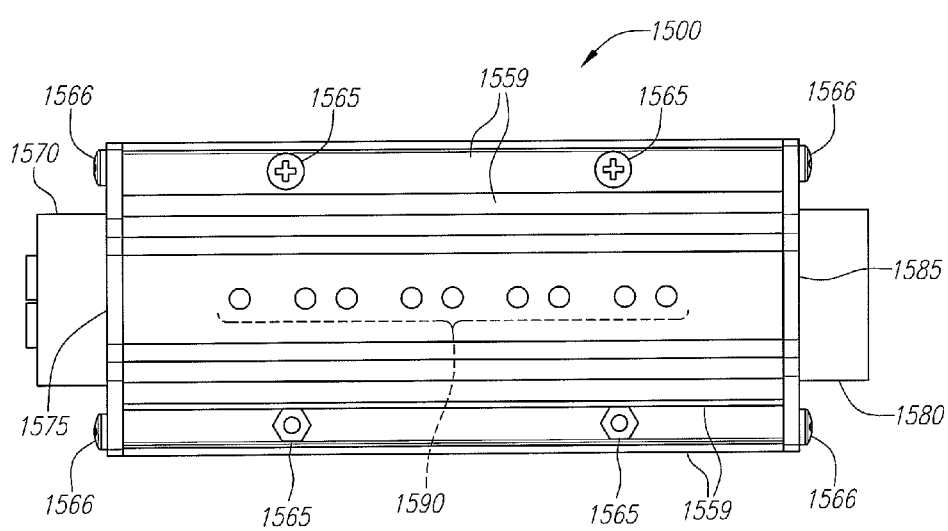

FIGS. 15A through 15F are more detailed diagrams of one possible embodiment of a network node in general accordance with some of the principles illustrated in and described with respect to, e.g., FIGS. 9A, 10 and 11. As illustrated in FIG. 15A, a node 1500 comprises a node housing 1501 which may, as with the node 900 illustrated in FIG. 9, be constructed of two opposing plates 1516, 1517 (see FIG. 15F) which are clammed together. The node housing 1501 may, as before, be constructed of a lightweight material such as aluminum that provides environmental protection and allows for heat dissipation, although different types of housings or materials (such as plastic, ceramics, metal composites, or any combination thereof) may be used in whole or part. The node housing 1501 may also be constructed with heat dissipating fins 1559, which are perhaps best illustrated in the cross-sectional view of FIG. 15E. The node housing 1501 of FIG. 15A is generally cylindrical in shape, and may be deployed within a network environment in a manner similar to that depicted in FIG. 12, for example.

Figure 15C:
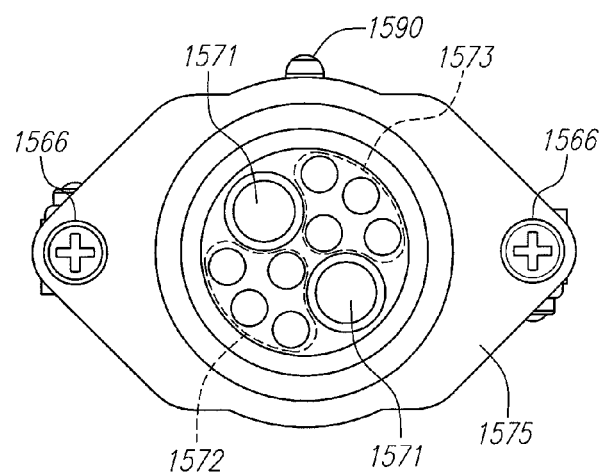
Figure 15D:
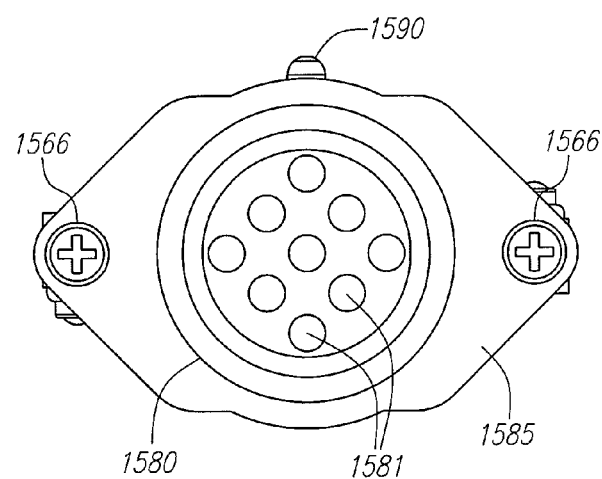
Figure 15E:
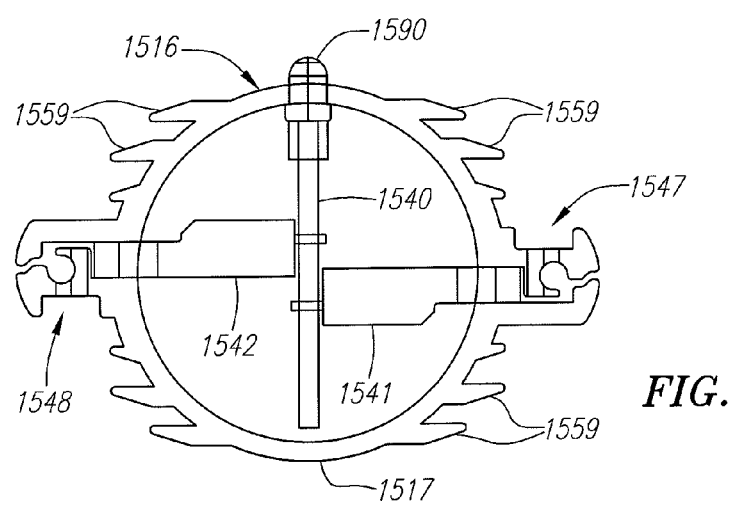
Figure 15F:
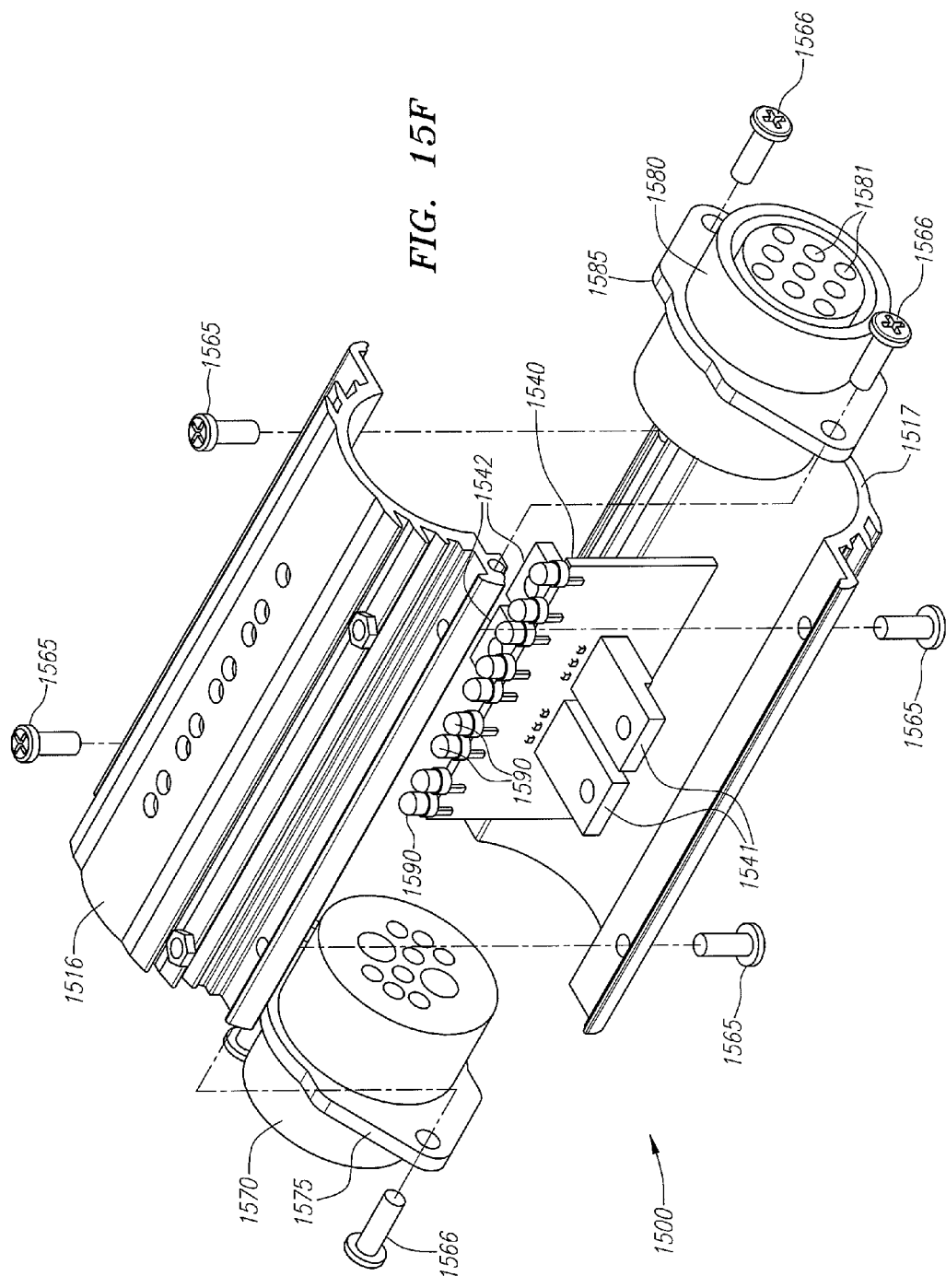

The node housing 1501 may further comprise a pair of end plates 1575, 1585, such as illustrated in FIG. 15F, each of which has various signal connectors as will be described. On one end plate 1575, as illustrated in FIGS. 15A, 15C and 15F, a bus connector 1570 may be provided for connection to other nodes (including a hub). The bus connector 1570 may include one or more power line connector(s) 1571 (for high power), as well as a variety of data line connectors 1572, 1573 (which may connect both data and low power in certain embodiments). The bus connector 1570, power line connector(s) 1571, and data line connectors 1572, 1573 may all have a similar function to components 1470, 1471, 1472 and 1473 described earlier with respect to FIGS. 14A-14C. One or more cables connected to bus connector 1570 may carry both data signals and power from an upstream node (or hub) and to various downstream network nodes. According to certain embodiments, the bus connectors 1570 connects to other nodes (or a hub) using a split cable (not shown), with the high power line connectors 1571 being split different directions, and with data line connectors 1572, 1573 also being split different directions—e.g., upstream and downstream. Such a configuration facilitates connection of a plurality of nodes in a loop or ring architecture. When the node 1500 is in a listening mode, it may pass through signals received of data line connectors 1572 to the other data line connectors 1573 for propagation to the next hub or node downstream, and vice versa. This action allows signals to be transmitted around a ring or loop of nodes. When the node 1500 is in an active transmission mode, it may transmit signals both directions—i.e., using both data connectors 1572, 1573. Further possible techniques relating to ring or loop communication, as may be used in connection with node 1500, are described with respect to FIGS. 18-20 later herein.

The node 1500 also may have various status indicators 1590 which are externally visible so that the status of the node 1500 may be conveniently observed or monitored. The status indicators 1590 may be embodied as, e.g., light emitting diodes (LEDs) or other suitable means. More sophisticated status indication means, such as an LCD display, may also be used.

The other end plate 1585 of the node 1500, as illustrated in FIGS. 15D and 15F, preferably comprises an input/output signal line connector 1580 which is adapted to connect with various signal lines for controlling or monitoring local devices. The node 1500 thus connects to the network via bus connector 1570 on one end of the node 1500, and to various local devices via an input/output signal line connector 1580 on the other end of the node 1500.

As with the nodes illustrated in FIGS. 10 and 11, the node 1500 may encapsulate a circuit board 1540 to which may be attached high power transistors (e.g., FETs) 1541, 1542, as illustrated in FIGS. 15E and 15F. The ends of high power transistors 1541, 1542 may be clamped between the top housing plate 1516 and bottom housing plate 1517 of the node housing 1501. Fastening means such as screws 1565 not only serve to secure together the top housing plate 1516 and bottom housing plate 1517, but may also improve heat dissipation by increasing the heat transfer capability. As also illustrated in FIGS. 15E and 15F, the status indicators 1590 may also be attached to circuit board 1540.

Figure 17:
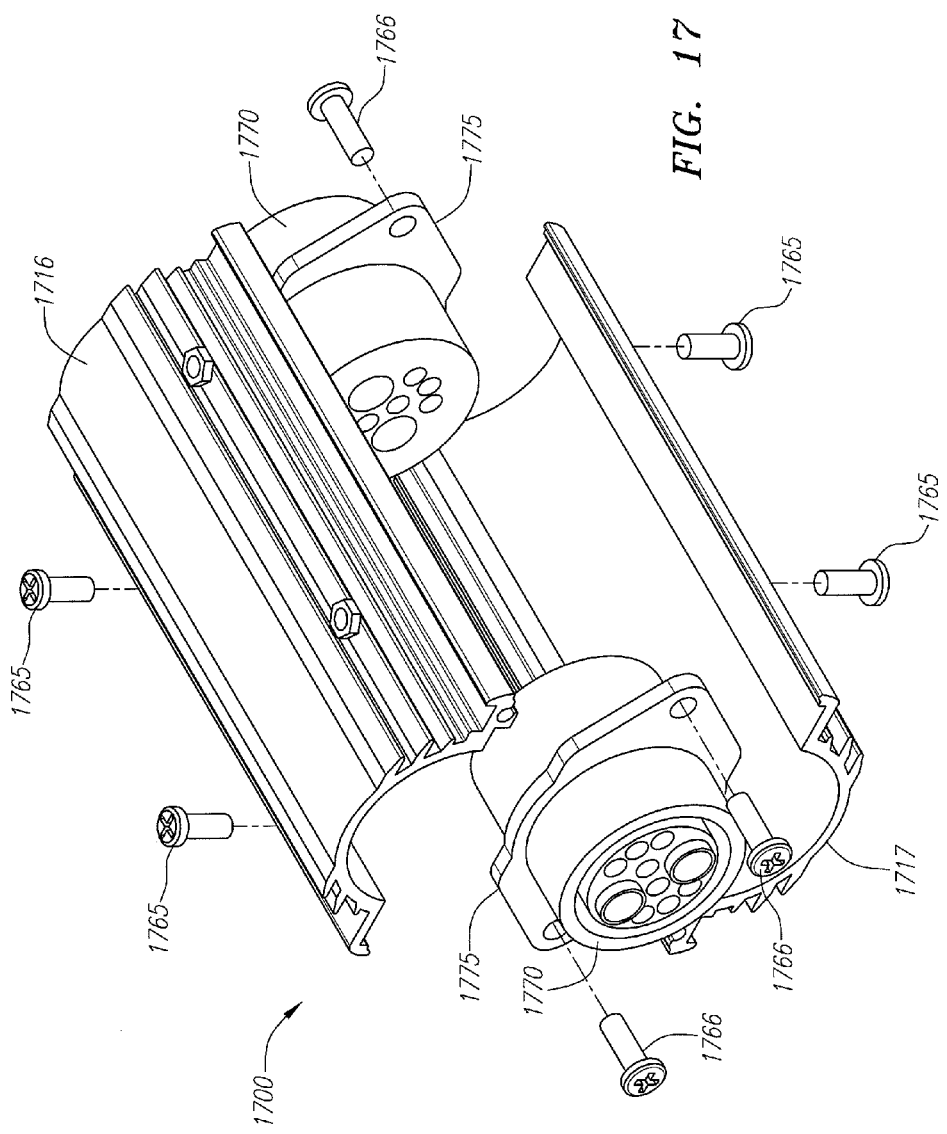
FIG. 17 is a diagram of an alternative embodiment of a network node similar to the network node illustrated in FIGS. 15A through 15F.

FIG. 17 is a diagram of an alternative embodiment of a network node, similar to the network node illustrated in FIGS. 15A-15F. In FIG. 17, components identified with reference numerals "17xx" are generally analogous to the components in FIGS. 15A-15F identified with reference numerals "15xx." Thus, node 1700 comprises a housing 1701 preferably constructed of a top plate 1716 and bottom plate 1717 that are secured together by suitable fastening means such as screws 1765. The main difference between the node 1700 in FIG. 17 and the one in FIGS. 15A-15F is that node 1700 has identical end plates 1775 with the same type of bus connector 1770 at each end of the node 1700. This configuration permits daisy chaining of nodes using single power/data cable segments, without the need for a split cable if a ring or loop architecture is desired. One of the bus connectors 1770 connects to an upstream node, and the other bus connector 1770 connects to a downstream node in the chain. Input/output signals may be connected to an input/output signal line connector (not shown) located at a suitable place on the housing 1701.

Figure 16:
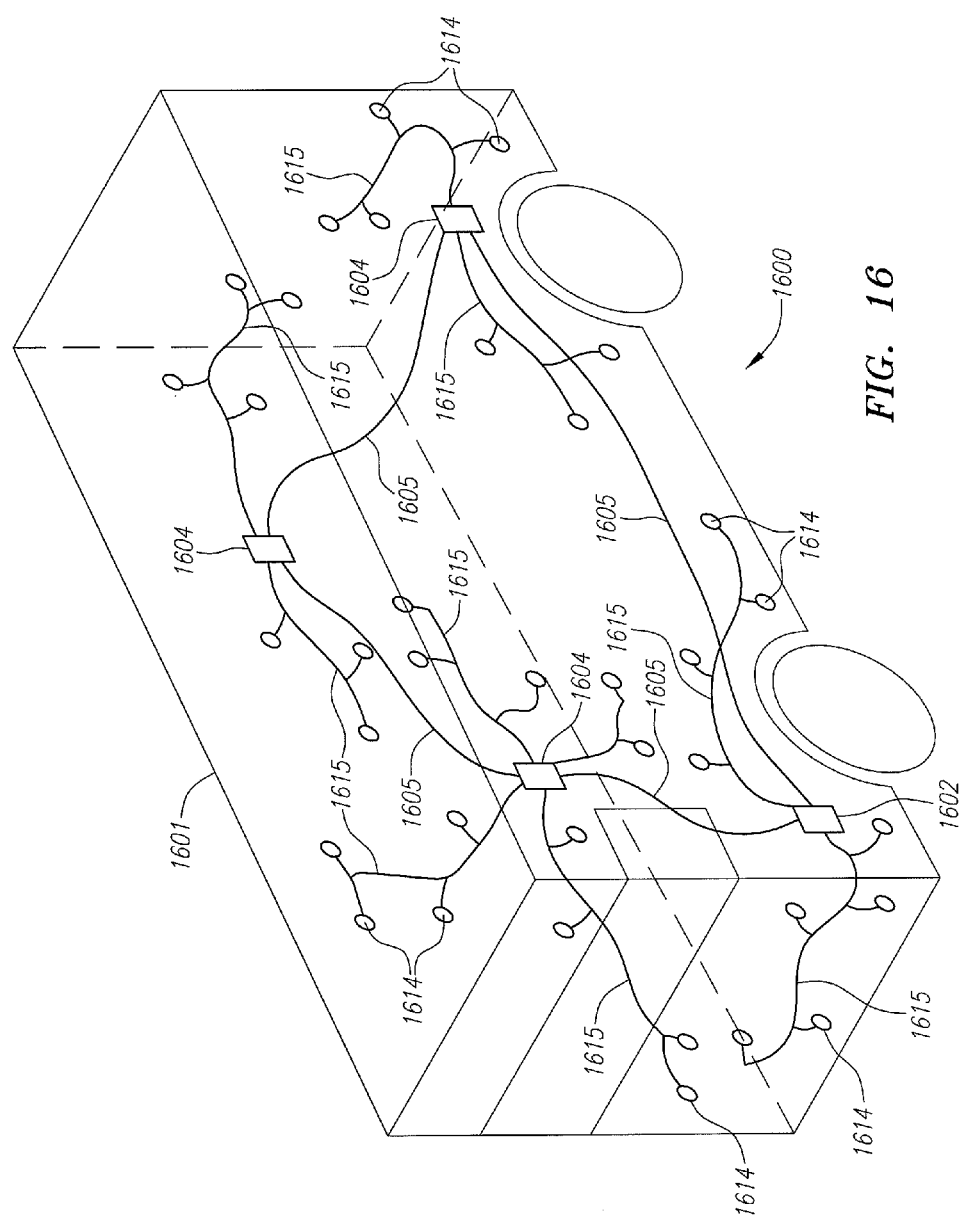
FIG. 16 is a block diagram illustrating the relative placement of network hubs and nodes of a control network within a vehicle environment.

FIG. 16 is a block diagram illustrating an example of the relative placement of network hubs and nodes of a control network 1601 within a vehicle environment. As illustrated in FIG. 16, a vehicle 1600 is outfitted with a control network 1601 comprising a number of hub controllers 1602, 1604 arranged in a loop or ring configuration (although other arrangements would also be possible). Preferably, the hub nodes include a master hub node 1602 and one or more slave hub controllers 1604, similar to the architecture described in FIG. 1 (with master hub node M and slave hub nodes S1, S2, S3) or FIG. 2 (with master hub node 202 and slave hub noes 204). The hub controllers 1602, 1604 are connected by cable segments 1605 which collectively comprise a main control bus, as described with respect to FIGS. 1 and 2, for example.

Each hub controller 1602, 1604 may connect to one or more additional buses 1615 which in turn connect to various additional nodes 1614. The overall architecture of the control network 1601 may be a hierarchical, master-slave network architecture such as described previously with respect to FIG. 1 or 2. The hub controllers 1602, 1604 may be embodied as, e.g., any of the hub controllers or power/data hubs in FIG. 3, 5, or 14A-14C, and the additional nodes 1614 may be embodied as, e.g., any of the nodes in FIG. 9A-9C or 15A-15F.

In a preferred embodiment, the control network 1601 is divided into control zones, which each of the hub controllers 1602, 1604 generally responsible for controlling a particular zone. The hub controllers 1602, 1604 are preferably dispersed throughout the vehicle 1600 at locations corresponding to their respective control zones. The lower tier nodes 1614 (assuming a hierarchical architecture) are likewise dispersed throughout the vehicle 1600, at locations which are physically proximate to the vehicle components or devices which they control or monitor. Preferably, the lower tier nodes 1614 can be programmed to determine whether or not to supply power to local loads located near them, in a manner previously described. The control network 1601 thereby allows distribution of both control information and power throughout the vehicle 1600. The architecture of FIG. 16, and more generally of FIG. 1 or 2, can greatly simplify wiring for a control network.

In a preferred embodiment, cables 1605 carry both high power among the various hub controllers 1602, 1604, and also carry data (e.g., control information) over fiber optic lines. Similarly, cable buses 1615 carry both high power among the various nodes 1614 and a hub controller 1602 or 1604, and also carry data (e.g., control information) among them over fiber optic lines. The hub controllers 1602, 1604 are preferably configured in a ring or loop architecture, so that if a cable is damaged or severed, or otherwise fails, a redundant communication path among the hub controllers 1602, 1604 remains. Where the hub controllers 1602, 1604 are embodied as depicted in FIG. 3, with an LCD screen or other display capable of displaying status information, they may act as individual, intelligent diagnostic points for the control network 1601.

In the control network 1601 of FIG. 16, or more generally the control networks 100 or 200 illustrated in FIG. 1 or 2, the hubs and additional nodes are arranged in a hierarchical architecture, with the higher tier nodes acting as masters for the lower tier slave nodes. Certain aspects of a preferred communication protocol will now be described with respect to the more general control network diagram of FIG. 2, but it should be understood that the principles will be applicable to a variety of more specific network implementations as well.

In various preferred embodiments, the master hub 202 and slave hubs 204 communicate using a time division multiplexing technique, such as a polling technique. The master hub 202 may, for example, broadcast information among the slave hubs 204, which respond with the information requested, or else may carry out commands issued by the master hub 202. Within each hub 202, 204, the hub master node 232 or 252 broadcasts information to the various hub slave nodes 234 or 254 over an internal bus 235 or 255, and the hub slave nodes 234 or 254 likewise respond with the information requested, or else carry out the commands issued by the hub master node 232 or 252. This same protocol is repeated for each of the lower-tier buses 215 and the nodes 214 connected thereto, with the hub slave nodes 254 acting as the master nodes with respect to the lower-tier buses. In this manner, hierarchical control may be readily achieved.

While the control network 200 is not limited to any particular communication protocol or technique, it may be advantageous in certain embodiments for the internal buses 235, 255 to comprise high-speed parallel buses, as they may be contained entirely within a hub controller, while the additional buses 215 may be serial buses comprised of, e.g., fiber optic lines. The hub master nodes 232 or 252 may thereby communicate with the hub slave noes 234 or 254 at high speed, while the hub slave nodes 234 or 254 communicate with their respective lower-tier nodes 214 according to a serial communication protocol, such as an RS 485 protocol. The individual buses 215 may communicate at different rates, such as 9 kB or 24 kB, for example.

The control network 200 may also have more than a single master hub or node at each tier, sharing concurrent control over the slave hubs or nodes. In such a case the master hubs or nodes may alternate or rotate communications with particular subsets of slave hubs or nodes. Upon failure of one master hub or node, the other may take over its responsibilities, thus providing backup master control capability. Also, as an alternative to time division multiplexing, or in addition thereto, the hubs or nodes may communicate using, e.g., different transmission wavelengths, thus allowing concurrent transmissions without interference, and/or may encode their transmissions using spread spectrum techniques (thereby utilizing a form of code division multiplexing).

Certain communication techniques that may be particularly well suited for communication in a ring or loop architecture, and applicable to various control network configurations described herein, will now be described with respect to FIGS. 18-20. The description of FIGS. 18-20 focuses more on the communication protocol, and omits details concerning, e.g., distribution of power among nodes or to various loads. Also, the description pertaining to FIGS. 18-20 occasionally refers generically to "nodes," which in this case encompasses hubs within its meaning. Additional details concerning techniques for communication in a master-slave control network environment, as may be used in connection with the various embodiments as described herein, are explained in detail in copending U.S. patent application Ser. No. 10/193,714 filed Jul. 10, 2002, assigned to the assignee of the present invention, and hereby incorporated by reference as if set forth fully herein.

Figure 18:
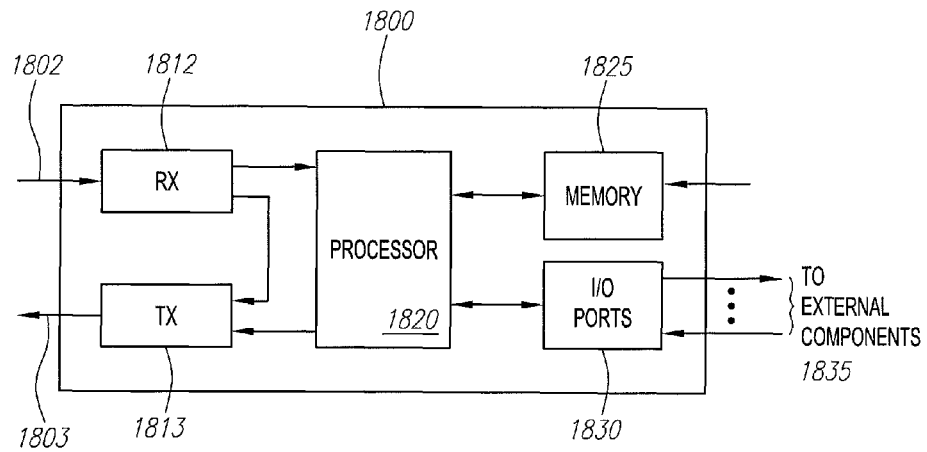
FIG. 18 is a schematic block diagram of a network node according to one embodiment as disclosed herein.

FIG. 18 is a block diagram of a network node 1800 according to one embodiment as disclosed herein, as may be utilized, for example, in the control networks of FIG. 1 or 2 (as, e.g., either a master node or a slave node). In FIG. 18, the network node 1800 comprises an optical receiver 1812 connected to one branch 1802 of an optical fiber of the ring network, and an optical transmitter 1813 connected to another branch 1803 of the optical fiber of the ring network. The optical receiver 1812 and optical transmitter 1813 are shown connected to a processor 1820, which may comprise, e.g., a microprocessor or microcontroller having suitable processing speed and data throughput to handle the functions to be carried out by the network node 1800. The processor 1820 is shown connected to a memory 1825, which preferably comprises a non-volatile portion (such as, e.g., ROM, PROM, EPROM, EEPROM, or flash ROM) and a volatile portion (e.g., RAM). The non-volatile portion of the memory 1825 may store programming instructions which are executed by the processor 1820 and thereby control the general operation of the network node 1800. The processor 1820 may also be connected to a plurality of I/O ports 1830, allowing the network node 1800 to interface with one or more external components. Examples of such external components include sensors, lights, switches, actuators, and so on.

In operation, the network node 1800 receives data from the fiber branch 1802 attached to the optical receiver 1812, processes the data using processor 1820 and/or stores the data, or other data generated in response thereto, in the volatile portion of the memory 1825, and, if the protocol calls for it, transmits data via the optical transmitter 1813 onto the fiber branch 1803.

In one or more embodiments, the network node 1800 directly passes through data from the optical receiver 1812 to the optical transmitter 1813, optionally with some level of processing. In a preferred implementation, the optical receiver 1812 converts optical data to electrical data, processes the electrical data, and passes the processed electrical data to the optical transmitter 1813, whereupon it is re-converted to optical data and transmitted over a fiber or other optical connection. When the data is in electrical form, it can be examined to determine, for example, whether the communication is intended for the particular node 1800, whether errors are present, and so on. In one example, if the network node 1800 receives a communication via optical receiver

1812 having errors associated with it, the network node 1800 adds an error code to the communication as it passes it along, via the optical transmitter 1813, for the next node. An error code may indicate, for example, that the communication received from the upstream node was not in an expected format, failed a cyclic redundancy check (CRC) or other error check, failed to contain an expected field or item of information, arrived at an unexpected time, or any other status condition. A master node or other downstream node in the control network may then use the error information to determine problems with the control network.

To facilitate reporting of status conditions using error codes, the control network in which the network node 1800 is utilized may employ a communication protocol in which messages exchanged among the various nodes have a pre-designated format which provides for the inclusion of an error code. The error code may, for example, be inserted in a designated location in the message, or else may be appended to the message. If desired, multiple error codes may be added to a message from multiple network nodes in the control network. The network node 1800 may be configured to add a new error code to a received message only if it detects an error different in nature from the error(s), if any, indicated by any existing error code(s) already included with the received message (as may have been added by a network node upstream in the control network, for example).

In certain alternative configurations of network node 1800, the network node 1800 may utilize an add/drop multiplexer in place of the optical receiver 1812 and optical transmitter 1813. A variety of add/drop multiplexer designs are known in the art of optical communication, and a detailed description thereof is not deemed necessary.

As another alternative, the optical receiver 1812 and optical transmitter 1813 may each be replaced with an optical transceiver, thereby providing the network node 1800 with bidirectional communication capability and, therefore, the ability to support bidirectional communication in the fiber optic ring network.

Figure 19:
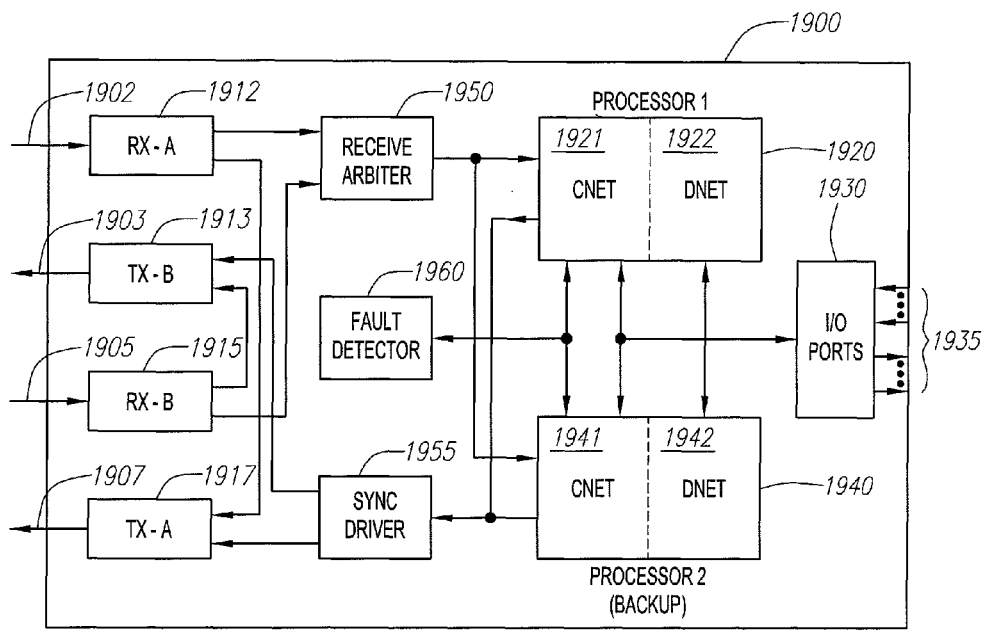
FIG. 19 is a schematic block diagram of a network node according to another embodiment as disclosed herein, adapted for use in a two fiber ring network.

FIG. 19 is a block diagram of a network node 1900 according to another embodiment as disclosed herein, adapted for use in a two fiber ring network (such as shown conceptually in, e.g., FIG. 8A, described in greater detail hereinafter). In FIG. 19, the network node 1900 includes two optical receivers 1912, 1915 and two optical transmitters 1913, 1917. The first optical receiver 1912 and optical transmitter 1917 are associated with the first fiber optic loop (designated the "A loop"), while the second optical receiver 1915 and optical transmitter 1913 are associated with the second fiber optic loop (designated the "B loop"). The first optical receiver 1912 has an output connected to the first optical transmitter 1917, to permit propagation of signals around the A loop. The second optical receiver 1915 has an output connected to the second optical transmitter 1913, likewise to permit propagation of signals around the B loop. Both optical receivers 1912, 1915 have outputs connected to a receive arbiter 1950, which, as will be explained, selects between data from optical receivers 1912, 1915 for further processing. Both optical transmitters 1913, 1917 are preferably driven by a synchronizing driver 1955. In the particular example illustrated in FIG. 19, the network node 1900 comprises two processors 1920, 1940, one of which (processor 1920 in this example) serves as the primary processor, and the other of which (processor 1940 in this example) serves as a backup processor in case the primary processor fails. A fault detector 1960 may be communicatively connected to both the processors 1920, 1940, allowing detection of faults by any of the means as described elsewhere herein. The fault detector 1960 is depicted in a conceptual manner and may represent actual hardware or else may simply represent functionality that is built in to the node's software instructions, or any combination thereof. For example, the fault detector may comprise, e.g., a watchdog timer, a software verification routine for periodically testing the integrity of the network ring, or any other hardware or software that can be used to detector a fault condition. Both processors 1920, 1940 are also preferably communicatively connected to a plurality of I/O ports 1930, allowing the processors 1920, 1940 to communicate with external components over various input/output signal lines 1935.

In certain embodiments, as explained later herein, the network node 1900 optionally may provide communication capability on a second ring of network nodes. The network node 1900 may have the capability of acting both as a slave and a master—i.e., a slave with respect to a first ring of network nodes, and a master with respect to a second ring of network nodes. Both the first ring and the second ring may comprise a pair of fiber optic cables for bidirectional communication in each ring. In such an embodiment, both processors 1920, 1940 of the network node 1900 may each comprise two processing units, labeled as "CNET" and "DNET" in the instant example, and the network node 1900 may further include a second set of transmit/receive optical components for communicating on the second ring (as illustrated in, e.g., FIG. 19). The CNET processing unit 1921 (or 1941), acting in a slave capacity, receives and responds to communications from a first network ring, while the DNET processing unit 1922 (or 1942), acting in a master capacity, transmits commands and receives feedback from slave nodes in the second network ring. As explained hereinafter, such a capability in the network node 1900 is particularly well suited for a hierarchical master-slave control network.

In operation, the network node 1900 is capable of receiving data on both loops A and B, and transmitting data simultaneously over both loops A and B. Because of differences in propagation delay times depending upon where the network node 1900 is situated in the ring network, the receive arbiter 1950 performs the task of determining which data (the A loop data or B loop data) should be utilized for further processing. According to a preferred embodiment, the receive arbiter 1950 does this by determining which loop data arrived first in time. The first arriving data is processed, while the second arriving data may be used to confirm the accuracy of the first arriving data, or else may be discarded.

Various possible circuits for receive arbiter, as may be used in the network node 1900 illustrated in FIG. 19, are illustrated in copending U.S. patent application Ser. No. 10/193,714 filed Jul. 10, 2002, assigned to the assignee of the present invention, and hereby incorporated by reference as if set forth fully herein. Other circuitry (e.g., a processor) in a network node may utilize the A/B arrival status, as well as other information (such as error status), to select between A-loop data and B-loop data for further processing. Other approaches to selecting between A-loop data and B-loop data may also be used.

Further explanation will now be provided concerning the operation of various control networks in which two fibers (A-loop and B-loop) are employed for bidirectional communication. FIG. 20 is a diagram illustrated a relatively simple example of a master-slave ring network 2000 having two fibers, and showing certain node details. In FIG. 20, a master node 2002 (which in this example is embodied as a network node 1900 such as described with respect to FIG. 19) and two slave nodes 2004 are connected by two fibers 2005 (A-loop)

and 2006 (B-loop) in a ring configuration. While two slave nodes 2004 are illustrated in FIG. 20, any number of slave nodes 2004 may be present.

As with the network node 1900 illustrated in FIG. 19, the master node 2002 preferably comprises two optical receivers 2012, 2015 and two optical transmitters 2013, 2017. The first optical receiver 2012 and optical transmitter 2017 are associated with the first fiber optic loop (the "A loop") 2005, while the second optical receiver 2015 and optical transmitter 2013 are associated with the second fiber optic loop (the "B loop") 2006. In certain embodiments, for example where multiple master nodes exist or where slave nodes have backup master node functionality, then the optical receivers 2012, 2015 may provide the capability of passing through data directly to the optical transmitters 2013, 2017. In such an embodiment, the first optical receiver 2012 may have an output (not shown) connected to the first optical transmitter 2017 to permit propagation of signals around the A loop, and the second optical receiver 2015 may likewise have an output (not shown) connected to the second optical transmitter 2013 to permit propagation of signals around the B loop.

Both optical receivers 2012, 2015, similar to the network node 1900 in FIG. 19, preferably have outputs connected to a receive arbiter 2050 which, as previously explained, selects between data from optical receivers 2012, 2015 for further processing. Both optical transmitters 2013, 2017 may be simultaneously driven by a synchronizing driver 2055. In the particular example illustrated in FIG. 20, the master node 2002 comprises two processors 2020, 2040, one of which serves as the primary processor and the other of which serves as a backup processor in case the primary processor fails. A fault detector 2060 is communicatively connected to both the processors 2020, 2040, allowing detection of faults as further described herein.

The slave nodes 2004 in the example of FIG. 20 each comprise a two optical receivers 2062, 2065 and two optical transmitters 2063, 2067. The first optical receiver 2062 and first optical transmitter 2067 are associated with the first fiber optic loop (the "A loop") 2005, while the second optical receiver 2065 and second optical transmitter 2063 are associated with the second fiber optic loop (the "B loop") 2006. The optical receivers 2062, 2065 preferably pass through data directly to the optical transmitters 2063, 2067. Accordingly, the first optical receiver 2062 has an output connected to the first optical transmitter 2067 to permit propagation of signals around the A loop 2005, and the second optical receiver 2065 likewise has an output connected to the second optical transmitter 2063 to permit propagation of signals around the B loop 2006. Both optical receivers 2062, 2065 preferably have outputs connected to a receive arbiter 2060 which selects between data from optical receivers 2062, 2065 for further processing. Both optical transmitters 2063, 2067 are driven by a synchronizing driver 2075.

The master node 2002 may communicate with the slave nodes 2004 according to any desired protocol. In a preferred embodiment, the master node 2002 polls the slave nodes 2004 periodically, according to, for example, graph 202 shown in FIG. 2, or according to any other suitable protocol.

When transmissions occur from the master node 2002 to the slave nodes 2004, the master node 2002 preferably transmits on both the A-loop 2005 and the B-loop 2006 simultaneously, but in opposite directions (as indicated by the arrows in FIG. 20). The synchronizing driver 2055 ensures that the transmissions on both the A-loop 2005 and the B-loop 2006 occur simultaneously. However, in certain embodiments, it may be desirable to gate the output of the synchronizing driver 2055 or otherwise make its output selectable, so that the integrity of the A-loop 2005 and the B-loop 2006 can be separately and independently tested. The same would be true for the slave nodes 2004 where it is possible for the slave nodes 2004 to take over the functionality of the master node 2002 in the case of a master node failure.

The first slave node 2004 in the "clockwise" direction, i.e., "Slave-1" in this example, directly receives the transmission from optical transmitter 2017 of the master node 2002 on the A-loop 2005, while the first slave node 2004 in the "counter-clockwise" direction, i.e., "Slave-2" in this example, directly receives the transmission from optical transmitter 2013 of the master node 2002 on the B-loop 2006. Slave-1 immediately propagates the received signal on the A-loop 2005 from the A-loop receiver 2062 to the A-loop transmitter 2067, whereupon the message is carried forward to Slave-2 on the A-loop 2005. Likewise, Slave-2 immediately propagates the received signal on the B-loop 2006 from the B-loop receiver 2065 to the B-loop transmitter 2063, whereupon the message is carried forward to Slave-2 on the B-loop 2006. Similarly, Slave-1 immediately propagates the received signal on the B-loop 2006 from the B-loop receiver 2065 to the B-loop transmitter 2063, whereupon the message is carried forward to the master node 2002 on the B-loop 2006, thus allowing the B-loop message to make a complete loop, and Slave-2 immediately propagates the received signal on the A-loop 2005 from the A-loop receiver 2062 to the A-loop transmitter 2067, whereupon the message is carried forward to the master node 2002 on the A-loop 2005, thus allowing the A-loop message to make a complete loop.

If any additional slave nodes 2004 were present, the A-loop message would be propagated in a "clockwise" direction from slave node to slave node in the same manner until eventually reaching the master node 2002 on the A-loop 2005, and the B-loop message would be propagated in a "counter-clockwise" direction from slave node to slave node in the same manner until eventually reaching the master node 2002 on the B-loop 2006.

At each slave node 2004, assuming no breakages on the transmission fibers or other disruptions to communication, a message will be received on both the A-loop 2005 and the B-loop 2006. Each slave node 2004 selects one of the two messages for further processing (or a combination of the two if errors are present but a complete message can be reconstructed from both receptions), and the slave node 2004 then determines whether the message from the master node 2002 was intended for the particular slave node and/or if a response is required. Selection between the two messages can be based upon the first arriving message (using an arbiter circuit such as described with respect to FIGS. 14, 15A, and 16), the number of errors in the received messages (if any), or a combination of the two. If a response to the received message is required, then, at a prescribed interval dictated by the particular communication protocol in use, the slave node 2004 responds with a return message transmitted via the synchronizing driver 2075 and optical transmitters 2063, 2067 over both the fibers 2005, 2006.

The return message from each slave node 2004 is propagated in both a "clockwise" and "counter-clockwise" direction by virtue of the two fibers 2005, 2006. For example, a return message transmitted by the first slave node 2004 (Slave-1) will propagate in a "clockwise" direction around the A-loop fiber 2005, via the second slave node 2004 (Slave-2) to the master node 2002. The return message will propagate in a "counter-clockwise" direction around the B-loop fiber 2006 to the master node 2002. The master node 2002 will receive the return message on both the A-loop fiber 2005 and B-loop fiber 2006, through optical receivers 2015 and 2012, respectively. The return message, in this particular example, is conveyed to a receive arbiter circuit 2050, which makes a decision as to which version of the return message (or combination of the two versions) to utilize for further processing.

A similar type of operation occurs for a message transmitted by the master node 2002 to the Slave-2 slave node 2004, and a return message transmitted by the Slave-2 slave node 2004 back to the master node 2002. In other words, the master node message is transmitted in opposite directions along both fibers 2005, 2006 from the master node 2002 to the Slave-2 slave node 2004, and the return message is transmitted in opposite directions along both fibers 2005, 2006 from the Slave-2 slave node 2004 back to the master node 2002. When the receiving slave node 2004 (either Slave-1 or Slave-2) receives a master node message intended for it, which is not a broadcast message intended for multiple slave nodes 2004, the receiving slave node 2004 may, in certain embodiments, be configured such that the slave node 2004 does not propagate the message any further around the loop. However, in a preferred embodiment, the slave node 2004 propagates the master node message around the remainder of the loop until the master node 2002 receives its own message back at its receiver 2012 or 2015. Among other things, this approach assists the master node 2002 in detecting fault conditions.

The format of master node and slave node messages transmitted within the network 2000 depend upon the particular type of network, protocol, and other such factors. For example, a message may comprise a series of data bits divided into various fields, and may be encoded, if desired, for security, error detection/correction, or other such purposes. According to one example, for instance, a master node message format includes one or more start delimiter data bits, a node identification field (and optionally additional message header fields), a master data message field, and one or more stop delimiter data bits; and the slave node message format includes a slave data message field a message authentication code ("MAC") or other integrity code, and, optionally, one or more header fields as well. Also, optionally, the slave node message format may include a variable-length error field in which a slave node 2004 can inject an error code indicating the type of observed error/fault and the location of the error (e.g., a node identification). The slave node 2004 may inject the error code when a master node message or slave node message is being propagated through the slave node 2004. The error code may indicate, by way of example, that the slave node 2004 did not receive a complete message, that it observed errors in the data bits or authentication code, that the signal strength from the preceding node was weak, and other types of conditions which may be of use to the master node 2002.

In its response message, the slave node 2004 can also include various types of error codes. By way of example, the slave node 2004 may indicate in its return message to the master node 2002 that it failed to receive the master node message on both the A-loop 2005 and the B-loop 2006. The master node may use such information to identify and locate faults in either or both of the loops 2005, 2006. The ring architecture may provide various advantages in terms of detecting faults and locate their proximity within the network. A fault may occur, for example, where a node's processor fails, or where one or more of its receivers or transmitters fail. Most of these situations will manifest by the failure of a message to be propagated around the network ring on one or both of the optical fibers. A fault may also occur where the fiber is physically damaged such that a transmission is degraded beyond a tolerable level.

In various embodiments, it may be desirable to provide slave nodes which serve a secondary functionality as a master node in case of failure by the master node, thereby increasing the redundancy and reliability of the overall network. Failure of the current master node commonly results in the master node either failing to transmit, or else transmitting improper control information to the slave nodes. According to a preferred redundant backup control protocol, the slave nodes periodically receive master-control messages from the master node and, in the event that proper master-control messages fail to appear, initiate a failure mode response procedure.

In operation, in accordance with one embodiment, the slave nodes S1, S2, . . . monitor the A loop and B loop while in a "listen" mode and await periodic master node messages from the master node M. Upon a failure to receive a transmission from the master node M on either the A loop or B loop within an expected time interval from a previously observed transmission, the slave nodes S1, S2, . . . begin to time a wait period (which, as described in more detail below, is preferably a different wait period for each slave node in the network). When the wait period elapses, the slave node determines that a failure in the master node for the particular data bus has occurred, and takes steps to take over the functionality of the master node.

Each of the slave nodes is preferably programmed with a different wait period, so that no contention occurs for replacing the master node M when a master node failure has occurred. In one aspect, backup control of each master node is prioritized, such that there is a specific order in which the slave nodes can potentially take over control of the master node functionality when a failure has occurred.

Each of the nodes (master and slave) may be provided with hardware components that facilitate operation in a network having redundant backup master capability. Each of the nodes, for example, may comprise an uplink mode processor and a downlink mode processor. With particular reference to, e.g., FIG. 19, each of the nodes may comprise an uplink mode processor such as "DNET" 1922 (or 1942 if provided with an internal backup processor or processors) and a downlink mode processor such as "CNET" 1921 (or 1941 if provided with an internal backup processor or processors). The "CNET" processor 1921 and "DNET" processor 1922 may comprise, e.g., co-processors which collectively form a portion of processor 1920, in addition to the supporting circuitry such as RAM (which may be dual-port in nature), ROM, and other digital components as may be provided. The downlink or "CNET" processor 1921 acts as a "master" processor and controls the other nodes in the network. There may be one master node or multiple master nodes in a particular ring network, but if multiple master nodes are present then each master node preferably controls a distinct subset of slave nodes. The uplink or "DNET" processor 1922 acts as a "slave" processor and responds to a master node in the ring network.

A master node may, in certain embodiments, utilize its downlink or "CNET" processor 1921 to control the slave nodes S1, S2, and S3. The slave nodes S1, S2, and S3 would receive, process, and respond to master node messages using their uplink or "DNET" processor. (Both the "CNET" and "DNET" processors 1921, 1922 and 1941, 1942 connect or have access to the A loop and B loop). Upon a failure of the master node, as detected by, e.g., a timeout of a predetermined wait period, then one of the slave nodes (for example, S1) takes over as the new effective master node. The slave node S1 then employs its downlink processor "CNET" 1921 to control the other two slave nodes S2 and S3. The slave node S1 may continue to transmit messages to its own uplink transceiver "DNET" 1922 so that slave node S1 can continue to carry out its former duties prior to the master node failure, or else it can control itself internally to continue to carry out those duties.

In a preferred embodiment, detection of a master node failure condition is accomplished using an internal timer mechanism, such as a hardware or software timer accessible (either directly or indirectly) by the uplink processor "DNET" 1922. Under a particular configuration, the slave node receives master node messages periodically from the master node M. The master node M may thereby, for example, request status information from the slave node, or instruct the slave node to carry out certain control or input/output functions. The slave node ordinarily responds by carrying out the requested functions and/or sending an acknowledgment or status signal to the master node M using the uplink processor "DNET" 1922. The internal timer mechanism of the slave node times out a wait period between master node messages received from the master node M. Each time the uplink processor "DNET" 1922 detects a master node message from the master node M that is recognized as an appropriate master node message within the particular programmed control protocol (whether or not the master node message is directed to the particular slave node), the uplink processor "DNET" 1922 resets the internal timer mechanism. If the internal timer mechanism ever times out, then the uplink processor "DNET" 1922 responds by asserting a failure mode response procedure. The timing out of the internal timer mechanism may result in an interrupt to downlink processor "CNET" 1921 in order to inform the downlink processor "CNET" 1921 of a perceived master node failure, or else, for example, the downlink processor "CNET" 1921 may periodically monitor the internal timer mechanism and commence a failure mode response procedure when it observes that the timer has timed out, or else the uplink processor "DNET" 1922 may set a flag in a dual port RAM (not shown) which is checked periodically by the downlink processor "CNET" 1921.

When the downlink processor "CNET" 1921 has been informed or otherwise determined that a failure mode condition exists, and that the master node M has presumably failed, the downlinkg processor "CNET" 1921 takes over as the new effective master node. When the failure mode is entered, the downlink transceiver "CNET" 1921 may be programmed so as to directly carry out the I/O port functions for which it previously received instructions from the first-tier master node, or the node may send master control messages to its own uplink processor "DNET" 1922, either externally via the A loop and/or B loop or internally via the dual port RAM or other means, and thereby continue to carry out the I/O port functions or other functions as it had previously been doing. In other words, the node can give itself control instructions so that it can continue to perform its previously assigned functions. If, after taking over for the master node M, the slave node's downlink processor "CNET" 1921 should fail, the node can still continue to perform its assigned functions when the next slave node S2 takes over control as the new effective master node, because its uplink processor "DNET" 1922 may continue to function in a normal manner in a slave mode.

According to the foregoing technique, a given slave node thereby substitutes itself for the master node M upon the detection of a master node failure as indicated by the failure to receive the expected master node control messages.

The order in which the slave nodes S1, S2, ... take over for the master node M may be dictated by the wait period timed by the internal timer mechanism of the particular slave node. The internal timer mechanism for each slave node is preferably programmed or reset with a different time-out value. A given slave node only asserts a failure mode condition when its internal timer mechanism reaches the particular timeout value programmed for that particular node.

The foregoing techniques thereby may provide redundant backup for the master node M in a control network, without necessarily requiring, for example, additional physical nodes to be located within the control network, and without having to provide wiring for such additional physical nodes to the optical loops A and/or B. The redundant backup for the master node M is also accomplished in a manner resolving potential contention problems that might otherwise occur if more than one the slave nodes detected a master node failure and simultaneously attempted to take control as effective master of the control network.

The architecture illustrated in FIGS. 1, 2 and 16 can be extrapolated to any number of tiers, and is not limited to three tiers. For example, each of the nodes 114, 214 or 1614 may control a lower-tier network, if desired.

The various ring networks described herein may be designed according to any of a variety of signaling protocols, including the SONET (Synchronous Optical Network) signal hierarchy. The SONET protocol/hierarchy defines a family of digital signals having bit rate which are integer multiples of a basic module signal, referred to as the Synchronous Transport Signal Level 1 (STS-1). The basic module signal is formed from a sequence of repeating frames, each of which includes a set number of bytes (e.g., eight bytes). Some of the bytes are reserved for overhead, while the remaining ones are available for data transport. A detailed explanation of the SONET protocol/hierarchy is not deemed necessary because such details are widely available and well known in the art.

The various network nodes as described herein may be constructed in any suitable manner and may, for example, comprise circuitry and various electronics housed in a rugged, potted case made of a suitable lightweight material such as aluminum that provides environmental protection and allows for heat dissipation. In other types of control environments, different types of housings or constructions may be used.

Many of the embodiments described herein will find particular applicability in on-board vehicle control systems. In this context, the term "vehicle" is used broadly to include any conveyance, including, by way of example, trains, buses, railcars, automobiles, trucks, ships, airplanes, tanks, and military vehicles.

The various embodiments described herein can be implemented using either digital or analog techniques, or any combination thereof. The term "circuit" as used herein is meant broadly to encompass analog components, discrete digital components, microprocessor-based or digital signal processing (DSP), or any combination thereof. The invention is not to be limited by the particular manner in which the operations of the various embodiments are carried out.

While certain system components are described as being "connected" to one another, it should be understood that such language encompasses any type of communication or transference of data, whether or not the components are actually physically connected to one another, or else whether intervening elements are present. It will be understood that additional circuit or system components may be added to the various illustrated or described embodiments without departing from teachings provided herein.

Various embodiments have been described herein in which two fibers are used for communication in the context of, e.g., a ring network system; however it will be appreciated that additional fibers can also be used in the ring network to, e.g., increase bandwidth or provide added redundancy. In addition, throughput may also be increased by transmitting at multiple distinct optical wavelengths (i.e., color or wavelength division multiplexing). A variety of techniques for color or wavelength division multiplexing are known in the art and therefore a detailed explanation thereof is not deemed necessary herein.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A hierarchical control network, comprising:
   a plurality of network nodes arranged in a plurality of tiers, said network nodes comprising a plurality of first-tier hub nodes and a plurality of lower tier nodes;
   a master control bus interconnecting said first-tier hub nodes in a loop configuration;
   an input power line electronically coupled to said first-tier hub nodes, said input power line providing a power signal derived from a high voltage power source; and
   one or more lower-tier buses interconnecting said first-tier hub nodes to groups of said lower tier nodes, said lower-tier buses including both data lines and a power source line, said power source line derived from said input power line for providing high power to said lower tier nodes for local distribution;
   wherein each lower-tier bus interconnects one of said first-tier hub nodes with one or more of said lower tier nodes, at least one of said lower-tier buses interconnecting one of said first-tier hub nodes with more than one of said lower tier nodes in a daisy chain configuration;
   wherein data signals and high voltage are communicated over the data lines and power source line, respectively, from the first-tier hub node to the respective lower tier nodes with which it is connected over the first-tier hub node's respective lower-tier bus; and
   wherein said lower tier nodes selectively distribute power from the power source line to local loads.

2. A hierarchical control network, comprising:
   a plurality of first-tier hub nodes having a master-slave relationship, with at least one of said first-tier hub nodes configured to operate as a master node for one or more first-tier hub nodes configured to operate as a slave node;
   a master bus interconnecting said first-tier hub nodes in a loop configuration; and
   connected to each first-tier hub node, one or more lower-tier buses interconnecting said first-tier hub node to one or more lower tier nodes, wherein each first-tier hub node is configured to operate as a master node for its lower tier nodes, and wherein its lower tier nodes are configured to operate as slave nodes;
   wherein said lower-tier buses include both low voltage data lines and a high voltage power line, said first-tier hub nodes operable to communicate data signals and high voltage power over the low voltage data lines and high voltage power line, respectively, to their respective lower tier nodes; and
   wherein said lower tier nodes selectively distribute power from the high voltage power line to local loads.

3. The hierarchical control network of claim 2, wherein at least one of said lower-tier buses interconnects one of said first-tier hub nodes with more than one lower tier node in a daisy chain configuration.

4. The hierarchical control network of claim 2, further comprising an input power line electronically coupled to said first-tier hub nodes, said input power line providing a power signal derived from a high voltage power source.

5. The hierarchical control network of claim 4, wherein the high voltage power source is a vehicle battery.

6. The hierarchical control network of claim 2, wherein each first-tier hub node configured to operate as a slave node comprises a plurality of internal hub nodes integrated within the same physical housing.

7. The hierarchical control network of claim 6, wherein said plurality of internal hub nodes comprises a first hub node adapted to interface, as a slave node, with the first-tier hub master node over the master bus, and one or more second hub slave nodes adapted to interface, as master nodes, with lower tier nodes using one of the lower-tier buses.

8. The hierarchical control network of claim 7, wherein the first hub node is configured to operate as a master node with respect to the one or more second hub slave nodes.

9. The hierarchical control network of claim 2, wherein one or more of said lower tier nodes comprises a plurality of high power switches for selectively coupling power from said high voltage power line to the local loads.

10. The hierarchical control network of claim 2, wherein said lower tier network nodes each comprise a cylindrical housing with a front end having a cable connection for receiving a lower-tier bus connector comprising terminals for both the low voltage data lines and the high voltage power line.

11. The hierarchical control network of claim 2, wherein said first-tier hub nodes and lower tier nodes are disposed in a vehicle and form at least part of a vehicle control system, and wherein the vehicle is divided into a plurality of distinct zones, with each first-tier hub node configured to control at least one of the distinct zones.

12. The hierarchical control network of claim 2, wherein each lower-tier bus connects its lower tier nodes in a daisy-chain configuration, whereby low voltage data signals and high voltage power are provided from each first-tier hub node to all of its respective lower tier nodes via the one or more lower-tier buses, thereby enabling distribution of high voltage power from the lower tier nodes to their local loads.

13. A vehicle control network, comprising:
   a plurality of first-tier hub controllers, each first-tier hub controller comprising a housing and a plurality of output ports, wherein at least one of said first-tier hub controllers is configured to operate as a master node for one or more first-tier hub controllers configured to operate as a slave node;
   a master bus interconnecting said first-tier hub controllers;
   an on-vehicle battery providing a high-power voltage source electronically coupled to said first-tier hub controllers;
   a plurality of lower-tier network nodes; and
   a plurality of lower-tier buses connected to said first-tier hub controllers, each of said lower-tier buses (i) connecting one or more of the lower-tier network nodes to one of the output ports of a first-tier hub controller, and (ii) including both low voltage data lines and a high voltage power line, said high voltage power line derived from said high-power voltage source;
   wherein said lower-tier network nodes receive both low voltage data signals and high voltage power from their respective first-tier hub controller over the lower-tier bus to which it is connected; and
   wherein said lower-tier network nodes distribute power to local loads in response to the low voltage data signals.

14. The vehicle control network of claim 13, wherein said first-tier hub controllers and lower-tier network nodes are disposed in a vehicle and form at least part of a vehicle control system, and wherein the vehicle is divided into a plurality of distinct zones, with each first-tier hub controller configured to control at least one of the distinct zones.

15. The vehicle control network of claim 13, wherein the master bus connects the first-tier hub controllers in a loop configuration.

16. The vehicle control network of claim 13, wherein each first-tier hub controller node comprises a power converter configured to convert incoming power from said high-voltage power source to low power.

17. The vehicle control network of claim 16, wherein each lower-tier bus further comprises a low-power line for distributing low power from the first-tier hub controller to the lower-tier network nodes connected to the lower-tier bus.

18. The vehicle control network of claim 13, wherein each first-tier hub controller is configured to operate as a master node for its lower-tier newtork nodes, and wherein its lower-tier network nodes are configured to operate as slave nodes.

19. The vehicle control network of claim 13, wherein each lower-tier bus connects the lower-tier network nodes to their respective first-tier hub controller in a daisy-chain configuration, and wherein low voltage data command signals and high power are provided from the first-tier hub controller to the lower-tier network nodes connected to the lower-tier bus.

20. A method for controlling a vehicle and distributing power with a control network, comprising:
   interconnecting a plurality of hub controllers over a master bus, each of the hub controllers having a plurality of output ports;
   operating one of said hub controllers as a master node with respect to one or more other hub controllers connected to the master bus;
   electronically coupling a high-power source to said hub controllers, said high-power source derived from a vehicle battery;
   connecting a plurality of lower-tier buses to said hub controllers, each of said lower-tier buses (i) connecting one of the output ports of the hub controller to one or more lower-tier network nodes, and (ii) including both low-voltage data lines and a high-voltage power line, wherein said lower-tier network nodes receive both low-voltage data signals and high-voltage power from their respective hub controller;
   operating each hub controller as a master node with respect to its lower-tier slave nodes; and
   distributing high-voltage power from said lower-tier network nodes to local loads in the vehicle in response to the low-voltage data signals from the hub controller carried over the lower-tier buses.

21. The method of claim 20, wherein each of said hub controllers configured to operate as a slave node comprises a plurality of internal hub nodes, the method further comprising:
   operating a first one of the internal hub nodes as a slave node with respect to the master bus, and as a master node with respect to the other internal hub nodes; and
   operating said other internal hub nodes as slave nodes with respect to the first one of said internal hub nodes.

22. The method of claim 20, wherein the master bus connects the hub controllers in a loop configuration.

23. The method of claim 20, wherein each lower-tier bus further comprises a low-voltage power line for distributing low power from the hub controller to the lower-tier network nodes over the lower-tier bus.

24. The method of claim 20, further comprising connecting each lower-tier bus to the lower-tier network nodes in a daisy-chain configuration, and providing low-voltage data signals and high power from the hub controller to the lower-tier netowrk nodes over the lower-tier bus via the daisy chain of lower-tier network nodes.

* * * * *